(12) United States Patent
Taylor

(10) Patent No.: US 7,742,701 B2
(45) Date of Patent: Jun. 22, 2010

(54) COHERENT OPTICAL CHANNEL SUBSTITUTION

(76) Inventor: Michael George Taylor, 8334 Sperry Ct., Laurel, MD (US) 20723

(*) Notice: Subject to any disclaimer, the term of this patent is extended or adjusted under 35 U.S.C. 154(b) by 920 days.

(21) Appl. No.: 11/377,783

(22) Filed: Mar. 16, 2006

(65) Prior Publication Data

US 2006/0210211 A1    Sep. 21, 2006

Related U.S. Application Data

(60) Provisional application No. 60/662,607, filed on Mar. 16, 2005.

(51) Int. Cl.
*H04J 14/02* (2006.01)
(52) U.S. Cl. .......................... 398/83; 398/204
(58) Field of Classification Search ............. 398/83–85, 398/203–206
See application file for complete search history.

(56) References Cited

U.S. PATENT DOCUMENTS

| | | | |
|---|---|---|---|
| 4,718,121 A * | 1/1988 | Epworth ................. 398/203 |
| 5,289,550 A * | 2/1994 | Plastow ..................... 385/9 |
| 5,400,167 A * | 3/1995 | Suemura ................. 398/209 |
| 5,515,199 A * | 5/1996 | Farina .................... 359/326 |
| 5,699,179 A * | 12/1997 | Gopalakrishnan ........... 398/194 |
| 5,748,349 A | 5/1998 | Mizrahi ................. 359/130 |
| 6,810,048 B2 | 10/2004 | Chethik .................. 372/28 |
| 7,031,617 B2 * | 4/2006 | Zucchelli et al. ............. 398/176 |
| 7,215,893 B2 * | 5/2007 | Harres ..................... 398/183 |
| 7,356,256 B1 * | 4/2008 | Strawczynski et al. ........ 398/33 |
| 7,471,903 B1 * | 12/2008 | Friskney et al. ............. 398/185 |
| 2004/0067064 A1 | 4/2004 | McNicol et al. ............. 398/158 |
| 2004/0105682 A1 | 6/2004 | Roberts et al. ............. 398/147 |
| 2004/0114939 A1 | 6/2004 | Taylor ................... 398/152 |
| 2004/0208626 A1 * | 10/2004 | Nishimura et al. .......... 398/161 |
| 2004/0208643 A1 * | 10/2004 | Roberts et al. ............. 398/186 |
| 2005/0007642 A1 | 1/2005 | McGhan et al. ............. 359/237 |
| 2005/0008369 A1 | 1/2005 | Winzer ................... 398/83 |
| 2006/0177224 A1 * | 8/2006 | Bablumyan ............... 398/83 |

* cited by examiner

*Primary Examiner*—Leslie Pascal
(74) *Attorney, Agent, or Firm*—Michael Diaz

(57) ABSTRACT

In an optical data transmission system, one channel is removed from a group of wavelength division multiplexed optical channels and another channel carrying different information at the same wavelength is inserted in its place. The process occurs by adding an optical signal whose electric field is the difference between the electric field of the new and old channels. The difference calculation takes into account the phase of the incoming WDM channel and phase of the laser source of the difference signal. The method has applications in optical transmission networks as add-drop nodes and optical regenerators, for generation of high bandwidth optical signals, and for secret optical communications.

30 Claims, 17 Drawing Sheets

COHERENT OPTICAL CHANNEL SUBSTITUTION

RELATED APPLICATIONS

This utility application claims the benefit of U.S. Provisional Patent Application Ser. No. 60/662,607 by Michael G. Taylor, filed Mar. 16, 2005, and is hereby incorporated by reference.

BACKGROUND OF THE INVENTION

1. Field of the Invention

This invention relates to optical data transmission over optical fibers. Specifically, and not by way of limitation, the present invention relates to optical data transmission utilizing coherent optical channel substitution.

2. Description of the Related Art

Information has been transmitted over optical fibers for some time. Details about this field are disclosed in "Optical Communication Systems," by J. Gowar (Prentice Hall, 2nd ed., 1993) and "Fiber-optic communication systems" by G. P. Agrawal (Wiley, 2nd ed., 1997), which are herein incorporated by reference. The information is usually in the form of binary digital signals, i.e. logical "1"s and "0"s, but fiber optics is also used to transport analog signals, such as cable TV signals. The present invention may be utilized with either digital or analog signals. However, for simplicity and exemplary purposes only, digital signals are discussed with the present invention. It should be understood by those skilled in the art that the present invention may also be used with analog signals. Every optical data transmission system has a transmitter, which emits light modulated with information into the fiber, and a receiver at the far end which detects the light and recovers the information. A long distance digital link may also use one or more digital regenerators at intermediate locations. A digital regenerator receives a noisy version of the optical signal, makes decisions as to what sequence of logical values ("1"s and "0"s) was transmitted, and then transmits a clean noise-free signal containing that information forward towards the destination.

As discussed, in Agrawal, an optical signal that is modulated has a broadened spectrum occupying a range of frequencies. Consider propagation of Gaussian input pulses in optical fibers having the amplitude $$A(t) = A_0 \exp\left(-\frac{1+iC}{2}\left(\frac{t}{T_0}\right)^2\right)$$

where $A_0$ is the peak amplitude. The parameter $T_0$ represents the half-width at 1/e-intensity point. The parameter C governs the linear frequency chirp imposed on the pulse. A pulse is said to be chirped if its carrier frequency changes with time. The Fourier spectrum of a chirped pulse is broader than that of the unchirped pulse. This can be seen by taking the Fourier transform of the equation above for A(t), so that $$\tilde{A}(\omega) = A_0 \left(\frac{2\pi T_0^2}{1+iC}\right)^{1/2} \exp\left(-\frac{\omega^2 T_0^2}{2(1+iC)}\right)$$

The spectral half-width (at 1/e-intensity point) is given by $$\Delta\omega_0 = (1+C^2)^{1/2} T_0^{-1}$$

In the absence of frequency chirp (C=0), the spectral width satisfies the relation $\Delta\omega_0 T_0 = 1$.

As described herein, if an optical signal is said to carry information then that information is useful to a recipient of the optical signal. However, there are other disclosures which employ a broader definition, where any optical signal that varies with time is said to carry information. The broader definition does not apply in the explanation of the present invention. The variations of the optical signal with time must convey a message that is of value to a recipient in order for the optical signal to contain information.

In the 1990's optical amplifiers were deployed in telephony and cable TV networks, in particular erbium doped fiber amplifiers (EDFAs) were deployed. These devices amplify the optical signals passing through them, and overcome the loss of the fiber without the need to detect and retransmit the signals. A typical long distance fiber optic digital link might contain some digital regenerators between the information source and destination, with several EDFAs in between each pair of digital regenerators.

A. WDM Network Topologies and Add-drop

Also in the 1990's, wavelength division multiplexing (WDM) was commercially deployed, which increased the information carrying capacity of the fiber by transmitting several different wavelengths in parallel.

There are several different topologies that may be employed in a WDM fiber optic network, which are illustrated in FIGS. 1a through e. The dashed, dotted and solid lines in FIGS. 1a through e represent three different wavelengths. The simplest topology is point-to-point transmission, shown in FIG. 1a, where all the wavelengths originate in the same location A (101) and terminate together at another location B. As shown in FIG. 1b, broadcast topologies are possible where a signal from one transmitter is split and goes to more than one receiver (locations B (102) and C (103) in FIG. 1b). In a WDM transmission system, one WDM channel can be dropped at an intermediate site while the others continue, as shown in FIG. 1c. The dropped channel 104 may be detected at that intermediate site (node D (105) in FIG. 1c). Alternatively, as shown in FIG. 1d, the dropped channel may traverse more fiber spans (from D (105) to E (106)) before being detected. The process of add-drop, illustrated in FIG. 1e, means that as well as dropping a WDM channel 104 of a certain wavelength at an intermediate site 107, a channel 108 of the same wavelength carrying new content is inserted and continues with the other channels. The added and dropped channels may originate and terminate at the add-drop node, as is shown in FIG. 1c or they may originate and terminate at a remote location, from the add-drop node, in analogy with FIG. 1d. To make an add-drop node (node D (105) in FIG. 1e), it is necessary to block light coming from the transmitter at A at the add-drop wavelength so it does not continue to B, and pass all other wavelengths going from A to B. U.S. Pat. No. 5,748,349 gives an example of the apparatus to perform the add-drop function. A high extinction is required for the blocking operation because the crosstalk onto the channel added at location D is in-band crosstalk, which causes more degradation to a signal than out-of-band crosstalk. Except for the broadcast case, fiber optic links are typically bidirectional and symmetric, so another channel, often in another fiber, is transmitted from the receiver site to the transmitter site.

Most fiber optic transmission systems installed today have static add-drop configurations. There has been substantial research into all-optical networks where connections between nodes are set up and taken down in an automated fashion according to demand. All-optical networks are described in "A Precompetitive Consortium on Wide-Band All-Optical Networks," by S. B. Alexander et al. (IEEE J. Lightwave Technol., vol. 11, no. 5/6, p. 714-735, 1993) which is incorporated herein by reference. The add-drop technology must be able to switch multiple wavelength channels from add-drop to passthrough. Also the components involved in signal transmission, that is transmitters and receivers, fiber spans, optical amplifiers, etc., must be able to support a wide range of possible end-to-end link scenarios, as the connections in an all-optical network are changed according to customer demand. Using the add-drop technology to switch in a digital regenerator at intervals along the link helps support long transmission distance scenarios. Hence, there is a need for a flexible add-drop technology that may be switched in and out at any one wavelength and which may be operated at a range of wavelengths. Also there is a need for a digital regenerator which may be switched in and out of a link and which may be operated at a range of wavelengths.

B. Direct Detection & Coherent Detection

The transmitter unit for a single WDM channel contains a light source, usually a single longitudinal mode semiconductor laser. Information is imposed on the light by direct modulation of the laser current, or by external modulation, that is by applying a voltage to a modulator component that follows the laser. The receiver employs a photodetector, which converts light into an electric current. There are two ways of detecting the light: direct detection and coherent detection. All the installed transmission systems today use direct detection. Although it is more complex, coherent detection has some advantages, and it was heavily researched into in the 1980s and the start of the 1990s, and has become of interest once again in the past few years.

Most deployed transmission systems impose information on the amplitude (or intensity, or power) of the signal. The light is switched on to transmit a "1" and off to transmit a "0". In the case of direct detection, the photodetector is presented with the on-off modulated light, and consequently the current flowing through it is a replica of the optical power. After amplification the electrical signal is passed to a decision circuit, which compares it to a reference value. The decision circuit outputs an unambiguous "1" or "0".

There is another class of modulation formats where information is encoded on the phase of the optical signal, such as optical differential phase shift keying (oDPSK). A photodetector does not respond to changes in the phase of the light falling on it, so a passive component called a discriminator is used before the photodetector receives the optical signal. The discriminator converts the changes in phase into changes in power to which the photodetector can respond.

Since a photodetector does not respond to the phase portion of an optical wave, if two wavelengths are input to the photodetector, the photodetector does not distinguish between them. The photocurrent is proportional to the sum of the powers of the two wavelength channels. WDM systems work by using passive optical filter components to separate out the different wavelength channels at the receive terminal, so each photodetector sees only one channel. This approach puts a limit on how close the channels can be spaced, which comes from the optical filter's ability to pass one channel and reject its neighbours.

The coherent detection method treats the optical wave more like radio, inherently selecting one wavelength and responding to its amplitude and phase. "Fiber-optic communication systems" by G. P. Agrawal provides an introduction to coherent detection. Coherent detection involves mixing the incoming optical signal with light from a local oscillator (LO) laser source. FIG. 2 illustrates an example of a coherent receiver suitable for detecting a binary phase shift keyed (BPSK) signal. The incoming signal 201 is combined with light 202 from a continuous wave (c.w.) local oscillator in a passive 2:1 combiner 203. The LO light has close to the same state of polarisation (SOP) as the incoming signal and either exactly the same wavelength (homodyne detection) or a nearby wavelength (heterodyne detection). When the combined signals are detected at photodetector 204, the photocurrent contains a component at a frequency which is the difference between the signal and local oscillator optical frequencies. This difference frequency component, known as the intermediate frequency (IF), contains all the information, that is amplitude and phase, that was on the optical signal. Because the new carrier frequency is much lower, typically a few gigahertz instead of 200 THz, all information on the signal can be recovered using standard radio demodulation methods. Coherent receivers see only signals close in wavelength to the local oscillator, and so by tuning the LO wavelength, a coherent receiver can behave as though having a built-in tunable filter. When homodyne detection is used, the photocurrent is a replica of the information and can be passed to the decision circuit 206 which outputs unambiguous "1" or "0" values. With heterodyne detection, the photocurrent must be processed by a demodulator 205 to recover the information from the IF. FIG. 2 illustrates a configuration for single-ended detection. There are other configurations for coherent detection. For example, a balanced detection configuration is obtained by replacing the 2:1 combiner by a 2:2 combiner, each of whose outputs are detected and the difference taken by a subtracting component.

Following is a mathematical description of the coherent detection process. (The complex notation for sinusoids is summarised in the Appendix.) The electric field of the signal may be written as $$Re[E_s(t)e^{i\omega_s t + i\phi_s(t)}]$$

where $E_s(t)$ is the slowly varying envelope containing the information encoded on amplitude and phase of the optical signal, $\omega_s$ is the angular frequency of the optical carrier, and $\phi_s(t)$ is the slowly varying phase noise associated with the finite linewidth of the laser. Writing the phase noise separate from the modulation envelope $E_s(t)$ has the advantage that in the case of digital information transmission $E_s(t)$ takes on only a small number of possible values, depending on the digital signal format. Similarly, the electric field of the local oscillator is written as $$Re[E_{LO}e^{i\omega_{LO} t + i\phi_{LO}(t)}]$$

where $E_{LO}$ is a constant given that the local oscillator is c.w., $\omega_{LO}$ is the angular frequency of the LO, and $\phi_{LO}(t)$ is the phase noise on the LO. The electric fields of the signal and LO are written as scalar quantities because it is assumed that they have the same state of polarisation. The electric field of the light arriving at the photodetector in FIG. 2 is the sum of the two electric fields $$E_1 = Re[E_s(t)e^{i(\omega_s t + \phi_s(t))} + E_{LO}e^{i(\omega_{LO} t + \phi_{LO}(t))}]$$

and the optical power is $$P_1 = E_1 * E_1$$

$$P_1 = |E_s(t)|^2 + |E_{LO}|^2 + 2Re[E_s(t)E_{LO}*e^{i(\omega_s-\omega_{LO})t+i(\phi_s(t)-\phi_{LO(t)})}] \quad (1)$$

In the case of single ended detection only one output of the combiner is used. $|E_{LO}|^2$ is constant with time. $|E_s(t)|^2$ is small given that the local oscillator power is much larger than the signal power, and for phase shift keying (PSK) and frequency shift keying (FSK) modulation formats $|E_s(t)|^2$ is constant with time. The dominant term in equation 1 is the beat term $Re[E_s(t)E_{LO}*e^{i(\omega_s-\omega_{LO})t+i(\phi_s(t)-\phi_{LO(t)})}]$. In appropriate conditions the beat term can be readily obtained from the photocurrent in the single-ended detection case. Alternatively when $|E_s(t)|^2$ is not small and varies with time, the beat term is produced directly by the balanced detection configuration. The equations that follow refer to the beat term. It is assumed that this term is obtained by single ended detection assuming the other terms do not contribute or by balanced detection.

There are two modes of coherent detection: homodyne and heterodyne. In the case of homodyne detection the frequency difference between signal and local oscillator is zero, and the local oscillator laser has to be phase locked to the incoming signal in order to achieve this. For homodyne detection the term $e^{i(\omega_s-\omega_{LO})t+i(\phi_s(t)-\phi_{LO(t)})}$ is 1, and the beat term becomes $$Re[E_s(t)E_{LO}*]$$

For the binary phase shift keying (BPSK) modulation format for example, $E_s(t)$ takes on the value 1 or −1 depending on whether a logical "1" or "0" was transmitted, and the decision circuit can simply act on the beat term directly.

With heterodyne detection there is a finite difference in optical frequency between the signal and local oscillator. All the amplitude and phase information on the signal appears on a carrier at angular frequency $(\omega_s-\omega_{LO})$, the intermediate frequency, and it can be detected with a demodulator using standard radio detection methods, such as synchronous detection, envelope detection or differential detection. Typically homodyne detection gives better performance than heterodyne detection, but is harder to implement because of the need for phase locking.

C. Sampled Coherent Detection

A new method of coherent detection called sampled coherent detection has been proposed and demonstrated recently, as described in U.S. Patent Application No. 2004/0114939 and in "Coherent detection method using DSP for demodulation of signal and subsequent equalization of propagation impairments" by M. G. Taylor (IEEE Phot. Tech. Lett., vol. 16, no. 2, p. 674-676, 2004) which are herein incorporated by reference. Digital signal processing (DSP) is employed in this method to obtain the information carried by a signal from the beat products seen at the outputs of a phase diverse hybrid. The field of digital signal processing is summarized below.

In sampled coherent detection, the signal and local oscillator are combined in a passive component called a phase and polarisation diverse hybrid. FIG. 3 shows a sampled coherent detection apparatus. The four outputs of the phase and polarisation diverse hybrid are detected by separate photodetectors 312 and then, after optional amplification by amplifiers 313, they are sampled by A/D converters 314. The sample values of the A/D converters are processed by the digital signal processor 315 to calculate the complex envelope of the signal electric field over time. The phase and polarisation diverse hybrid has four outputs 308 through 311 in the example of FIG. 3, where single ended detection is used. The top two outputs 308 and 309 have the LO in one state of polarisation, e.g., the horizontal polarisation, and the lower two outputs 310 and 311 have the LO in the orthogonal, vertical, polarisation. For each of the two LO polarisation states, the signal is combined with the LO in a 90° hybrid 305, also known as a phase diverse hybrid. The phase of the LO relative to the signal in one output of the 90° hybrid is different by π/2 radians (i.e. 90°) compared to the phase of the LO relative to the signal in the other output. This phase shift can be implemented by extra path length in one arm 306 of the 90° hybrid carrying the LO compared to the other arm 305, as can be seen in FIG. 3. The orthogonal SOP relationship between the two 90° hybrids is achieved by using a polarization beamsplitter 304 to divide light from the local oscillator 302 between the two hybrids and a standard 1:2 splitter 303 to divide the incoming signal light 301.

The following mathematical treatment explains how the electric field of the signal is obtained from the outputs of the phase and polarisation diverse hybrid. The incoming signal electric field can be written as $$Re[E_s(t)e^{i\omega_s t+i\phi_s(t)}]$$

where $E_s(t)$ is a Jones vector, a two-element vector comprising the polarisation components of the electric field in the horizontal and vertical directions. The use of Jones vectors is summarised in the Appendix.

$$E_s(t) = \begin{pmatrix} E_{sx}(t) \\ E_{sy}(t) \end{pmatrix}$$

Each of the four outputs of the phase and polarization diverse hybrid in FIG. 3 contains signal $Re[E_s(t)e^{i\omega_s t+i\phi_s(t)}]$. The local oscillator in the four outputs is different, and can be written as follows top output ... $Re[E_{LO}e^{i\omega_{LO}t+i\phi_{LO}(t)} \hat{x}]$ 2nd output ... $Re[i\, E_{LO}e^{i\omega_{LO}t+i\phi_{LO}(t)} \hat{x}]$ 3rd output ... $Re[E_{LO}e^{i\omega_{LO}t+i\phi_{LO}(t)} \hat{y}]$ 4th output ... $Re[i\, E_{LO}e^{i\omega_{LO}t+i\phi_{LO}(t)} \hat{y}]$ In the top two arms the LO is horizontally polarized, in the direction of Jones unit vector $\hat{x}$, and in the lower two arms vertical in the direction of $\hat{y}$. The π/2 phase shift is accounted for by the multiplicative imaginary number i. The beat term parts of the optical powers in the four outputs 308 through 311 are therefore beat term $1 = Re[E_{sx}(t)E_{LO}*e^{i(\omega_s-\omega_{LO})t+i(\phi_s(t)-\phi_{LO}(t))}]$ beat term $2 = Im[E_{sx}(t)E_{LO}*e^{i(\omega_s-\omega_{LO})t+i(\phi_s(t)-\phi_{LO}(t))}]$ beat term $3 = Re[E_{sy}(t)E_{LO}*e^{i(\omega_s-\omega_{LO})t+i(\phi_s(t)-\phi_{LO}(t))}]$ beat term $4 = Im[E_{sy}(t)E_{LO}*e^{i(\omega_s-\omega_{LO})t+i(\phi_s(t)-\phi_{LO}(t))}]$ So the envelope of the signal electric field can be calculated from $$E_s(t) = \frac{e^{-i(\omega_s-\omega_{LO})t-i(\phi_s(t)-\phi_{LO}(t))}}{E_{LO}^*} \begin{pmatrix} (\text{beat term1}) + i(\text{beat term2}) \\ (\text{beat term3}) + i(\text{beat term4}) \end{pmatrix} \quad (2)$$

To implement equation 2 in the digital signal processor, the frequency difference $\omega_s - \omega_{LO}$ and phase difference $\phi_s(t) - \phi_{LO}(t)$ must be known. These parameters can be obtained using a standard phase estimation technique, such as described in "Digital Communications" by J. G. Proakis (McGraw-Hill, 4th ed., 2000) and "Digital communication receivers: synchronization, channel estimation & signal processing" by H. Meyr, M. Moeneclaey & S. A. Fechtel (Wiley, 1998).

Transmission over a length of optical fiber transforms the state of polarization of an optical signal, so that the digital values taken on by $E_s(t)$ as seen at the receive end of a fiber optic transmission system are typically not the same as those imposed at the transmit end. The polarization transformation can be reversed within the DSP by applying the appropriate rotation Jones matrix. The correct rotation matrix can be found by exploring the available space and then locking on to the matrix which gives the best quality signal. The polarization transformation of the optical fiber typically changes slowly, so the rotation matrix must be allowed to update.

The Jones vector $E_s(t)$ constitutes a complete description of the optical signal, or more precisely of the signal's optical spectrum in the region of the local oscillator. This means that any parameter of the optical signal can be deduced from $E_s(t)$. Employing sampled coherent detection is more complex than direct detection, but has many benefits. Phase encoded modulation formats can be employed, such as BPSK and quadrature phase shift keying (QPSK), which offer better sensitivity than on-off modulation formats. Also polarization multiplexed formats can be employed, which offer twice the information capacity for a given bandwidth of electro-optic components and a given optical spectral bandwidth. The polarization demultiplexing operation is performed within the digital signal processor, so no additional optical components are needed for it. In a long fiber optic transmission system carrying high bit rate signals the optical fiber propagation effects, such as chromatic dispersion and polarization mode dispersion, distort the signals. With sampled coherent detection the propagation effects can be reversed within the DSP by applying an appropriate mathematical operation.

Finally, a key benefit of sampled coherent detection is that it is equivalent to passing the signal through a narrow optical filter centered on the local oscillator wavelength, so no narrow optical filter components are needed for WDM. The LO can be tuned in wavelength, which is equivalent to tuning the optical filter, and lower WDM channel spacings should be possible with sampled coherent detection than with any WDM implementation using passive optical filters. However, because sampled coherent detection is a means of observing a signal, the narrow channel spacing is not available in conjunction with a WDM channel add-drop. At the add-drop node the dropped channel must be extinguished before the add channel is inserted, and even if the narrowest available physical optical filter were used, it would work correctly only if the neighboring channels were spaced farther away than if the only constraint were the ability to detect with sampled coherent detection. Hence it is desirable to have a method of dropping and adding a WDM channel which allows the same low channel spacing as with detection only.

D. Digital Signal Processing

The present invention utilizes digital signal processing (DSP). DSP is described in "Understanding Digital Signal Processing" by R. G. Lyons (Prentice Hall, 1996), herein incorporated by reference. A signal processor is a unit which takes in a signal, typically a voltage vs. time, and performs a predictable transformation on it, which can be described by a mathematical function. FIG. 4a shows a generic analog signal processor (ASP). The box 402 transforms the input signal voltage 401 into the output signal voltage 403, and may contain a circuit of capacitors, resistors, inductors, transistors, etc. FIG. 4b illustrates a digital signal processor. First, the input signal 401 is digitized by the analog to digital (A/D) converter 404, that is converted into a sequence of numbers, each number representing a discrete time sample. The core processor 406 uses the input numerical values to compute the required output numerical values, according to a mathematical formula that produces the required signal processing behavior. The output values are then converted into a continuous voltage vs. time by the digital to analog (D/A) converter 408. The connections 405 and 407 between the A/D and D/A converters and the core processor are typically implemented as parallel data connections, which is why they are drawn as grey strips in FIG. 4b as well as in some of the other figures.

Digital signal processing can be a better solution than analog signal processing for a task because the signal processing operation can be varied under programmable control and because operations can be performed that would require too much complexity if done by ASP. The examples presented herein refer to a single digital signal processor, but in fact the DSP may be made up of several processors that communicate with one another, and they do not have to be co-located.

E. Secret Communications

Additionally, there are applications for secret communications, where the information being transmitted is not available to someone who has access to the transmission system at an intermediate location. Optical transmission is not inherently secure. An eavesdropper who taps off some of the optical signal power may observe the same signal as the intended recipient. If the signal is a digital signal the eavesdropper can reconstruct the same digital sequence as the intended recipient. Using a phase or polarization encoded format will stop the eavesdropper receiving the information if direct detection is utilized, but not if coherent detection also is used.

Many encryption methods are available that operate on the digital data, as discussed in "Applied cryptography" by B. Schneier (Wiley, 2nd ed., 1996). Clearly, one of these encryption methods could be used prior to optical transmission and the corresponding decryption method after detection, to make the optical transmission link secure. Most encryption methods employ a secret key known to the intended recipient, but not to an eavesdropper. The key is a piece of data typically shorter than the message it encodes. The security of the code is maintained even if the eavesdropper knows the design of the code, provided he does not know the key being used by that particular recipient. If the length of the key is m bits, then the eavesdropper can break the code by trying all $2^m$ possible values of key. m is chosen as a large value such that an exhaustive key search would require an unreasonable amount of time and effort. However, for many codes whose design has been published a mode of decrypting the code has been found, often after years of research, which requires less effort than trying $2^m$ key combinations. Thus it is desirable to find new encrypting methods which inherently require an unfeasibly long time and/or large resources to break.

Transmission in the optical domain offers some features which allow encryption with a higher level of security than using the data domain. For example, the optical domain has a much higher information carrying capacity than an electrical cable or link. Frequency hopping (FH) is a method that has been used for some time in secure radio transmission, and can be applied to the optical domain as described in "Secure optical communications utilizing PSK modulation, polarization multiplexing and coherent homodyne detection with wavelength and polarization agility," by A. Salamon et al. (Military Communications Conference 2003 (MILCOM 2003), vol. 1, p. 274-282, 2003). The optical carrier frequency $\omega_s$ is changed suddenly over time according to a frequency hop plan derived from the secret key. The intended recipient who knows the frequency hop plan can tune his receiver to the correct channel $\omega_s(t)$ as it changes with time, and recover the signal that was sent. An eavesdropper must listen to all possible channels to be able to assemble the signal correctly. Security is improved by frequency hopping, but it can be defeated by an eavesdropper who has equipment to listen to all channels.

Thus, there is a need for an optical domain encryption method which can be implemented cost effectively for the intended information recipient but which is unfeasible to overcome by an eavesdropper.

SUMMARY OF THE INVENTION

The invention disclosed here is a method and apparatus to remove a WDM channel from an optical fiber and replace it with another channel of the same wavelength carrying different information. The substitution of the WDM channel is achieved by combining with the light passing through the optical fiber a modulated beam of light whose electric field can be considered to be the sum of two components. The first component cancels the WDM channel that is to be removed by destructive interference. The second component corresponds to the new WDM channel containing the new different information. The modulation on the beam of light that is added takes into account the optical phase of the WDM channel to be removed compared to the phase of the laser source from which the beam is obtained. Also, the modulation on the light beam takes into account the relative states of polarization of the WDM channel to be removed and the add laser source.

In one aspect, the present invention performs an add-drop function in an fiber optic telecommunications network.

In another aspect, the invention acts as a digital regenerator which replaces a noisy WDM channel with a channel at the same wavelength that has no noise. The density of WDM channels may be so high that demultiplexing using passive optical components is not possible.

In another aspect, the invention is a method to synthesize a WDM channel that occupies a wide optical bandwidth, such as a high baud rate digital signal, using several lasers at neighboring wavelengths. Each laser is modulated at a slower rate than would be required to generate the high baud rate optical signal directly.

In yet another aspect, the invention provides a way to phase lock one laser to an incoming optical signal without using feedback.

In a further aspect, the present invention is a secret communication system. Information which is intended to be secret is inserted into the spectrum of a broadband optical noise source, in such a way that an eavesdropper cannot identify the true information-bearing channel apart from a slice of noise spectrum. The information may be coded before being modulated onto an optical carrier in such a way that the optical signal resembles a spectral slice of optical noise. Only the intended recipient, who knows the spectral location of the channel and the coding method used to disguise the channel, can obtain the information on the channel without unreasonable time and effort.

DESCRIPTION OF THE INVENTION

Figure 5:
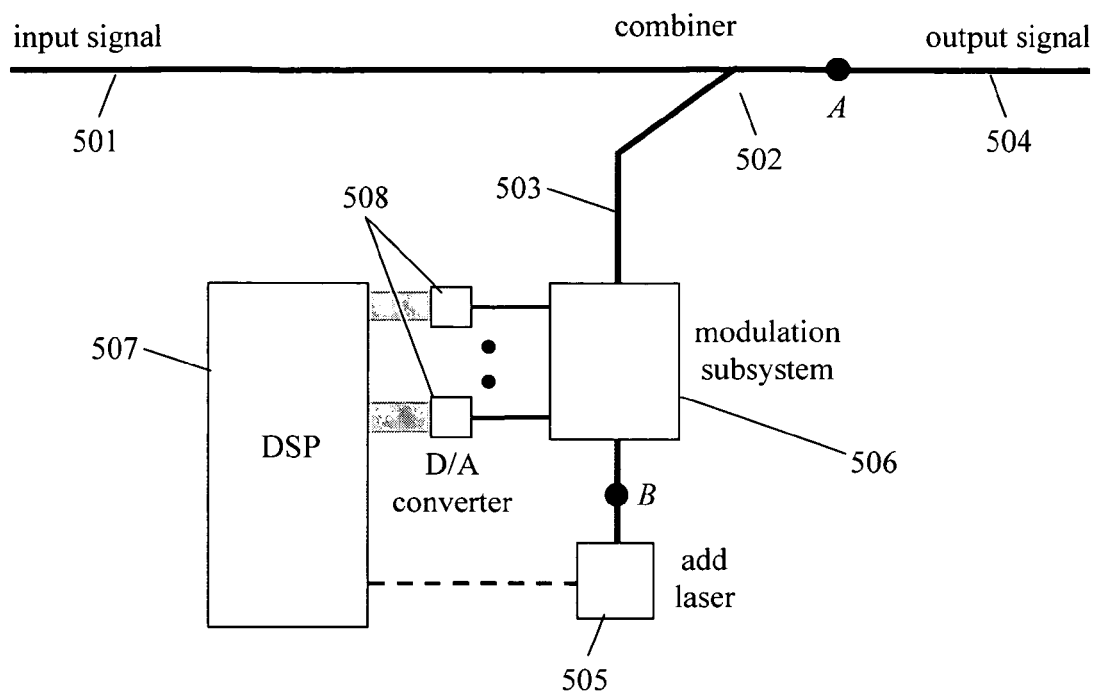
FIG. 5 illustrates a basic coherent channel substitution apparatus.

FIG. 5 illustrates the most basic implementation of coherent channel substitution. The present invention adds to the fiber a modulated signal 503 from the add laser which is the difference between the actual signal of the WDM channel at the add laser's wavelength arriving at the input and the desired output WDM channel signal. This converts the input signal 501 into the desired output signal 504. The field modulated onto the add laser 505 must take into account the phase noise on the add laser and on the input signal, as well as their respective SOPs. The modulation to the add laser is applied by a modulator 506 and a combiner 502 introduces the modulated add signal 503 into the main fiber. The modulator is controlled by several analog voltages which are set by D/A converters 508 which are, in turn, set by the digital signal processor 507. The DSP may also control the add laser directly, which is indicated by the dotted line in FIG. 5.

The feature that is central to the configuration of FIG. 5 is the combining of one optical signal 501 with another optical signal 503. There are many examples in the prior art where two optical signals are combined. The present invention is different from the prior art examples in that the two signals purposely coherently interfere to form a new optical signal whose electric field envelope is the desired electric field envelope. Two optical signals coherently interfere only if their optical spectra substantially overlap, if the second optical signal has substantial content in the state of polarization of the first optical signal, and if the two optical signals are present at the same time. In one prior art example, wavelength division multiplexing, the two optical signals are two different wavelength channels being combined. The present invention is different from the WDM case in that the input signal 501 and add signal 503 substantially overlap in optical spectrum. Another prior art example is polarization multiplexing of two optical signals, where the two signals to be combined have mutually orthogonal states of polarization. The present invention is different from the polarization multiplexing case in that the input signal 501 has substantial content having the same SOP as the add signal 503. Another prior art example is in optical packet transmission, where two bursts of light are combined that are on at different times. Again the present invention is different from this optical packet transmission case because the input signal 501 and add signal 503 substantially overlap in time of presence. In these prior art examples there is sometimes a partial overlap of the optical spectrum or the states of polarization of the two optical signal being combined, and the degree of overlap is kept low in order for the system to function correctly. In the case of the present invention, the overlap of the optical spectrum, SOP and time of presence of the two optical signals being combined is intentional. Thus, the system would not function correctly if the overlap were avoided.

The process of changing the input optical signal into the output signal is described mathematically as follows. The input optical fiber contains a signal with electric field $\text{Re}[E_{in}(t)e^{i\omega_{in}t+i\phi_{in}(t)}]$, and perhaps other WDM channels in addition. This is the electric field that would be observed at point A in FIG. 5 if the add laser were switched off. It is desired to substitute this signal with another having the same nominal wavelength, whose electric field is $\text{Re}[E_{out}(t)e^{i\omega_{out}t+i\phi_{out}(t)}]$ (referenced at point A). Here $\omega_{out}$ and $\phi_{out}(t)$ are stated explicitly, although for some applications, it may be simplest to keep them the same as $\omega_{in}$ and $\phi_{in}(t)$. The change in channel may be achieved by adding a signal to the optical fiber whose electric field is $$\text{Re}[E_{out}(t)e^{i\omega_{out}t+i\phi_{out}(t)} - E_{in}(t)e^{i\omega_{in}t+i\phi_{in}(t)}]$$

The add laser has an electric field, before modulation is applied to it, of $\text{Re}[E_{add}e^{i\omega_{add}t+i\phi_{add}(t)}\hat{p}_{add}]$, as would be observed at point B in FIG. 5. Thus, the optical spectrum of the add optical signal has a substantially similar shape to the optical spectrum of the input optical signal. $E_{add}$ is constant given that the laser is c.w., and $\hat{p}_{add}$ is the Jones unit vector of the add laser's SOP. (The principle of coherent channel substitution can be applied even if the add laser has modulation on it by following the equations below with a time dependent $E_{add}\hat{p}_{add}$.) When a signal is represented as a Jones vector, the act of modulating the signal is expressed mathematically as premultiplication by a time-dependent Jones matrix. To achieve the desired coherent substitution function, the add laser must be modulated by Jones matrix $M_{add}(t)$ such that $$M_{add}(t)E_{add}e^{i\omega_{add}t+i\phi_{add}(t)}\hat{p}_{add}L_{BA} = \quad (3)$$

$$E_{out}(t)e^{i\omega_{out}t+i\phi_{out}(t)} - E_{in}(t)e^{i\omega_{in}t+i\phi_{in}(t)}$$

$$M_{add}(t)\hat{p}_{add} = \frac{E_{out}(t)e^{i(\omega_{out}-\omega_{add})t+i(\phi_{out}(t)-\phi_{add}(t))} - E_{in}(t)e^{i(\omega_{in}-\omega_{add})t+i(\phi_{in}(t)-\phi_{add}(t))}}{E_{add}L_{BA}}$$

$L_{BA}$ is a complex factor whose magnitude comes from the insertion loss from point B to point A, and whose phase is the phase shift associated with the path from B to A at $\omega_{add}$. It may appear from equation 3 that the modulation function $M_{add}(t)$ has eight degrees of freedom, i.e. four complex elements, but in fact for the most complicated case, where $E_{in}$ and $E_{out}$ are polarization multiplexed QAM signals, only four degrees of freedom are needed. Some simple cases require fewer than four degrees of freedom. The choice of $M_{add}(t)$ depends on $\hat{p}_{add}$, such that the product $M_{add}(t)\hat{p}_{add}$ follows equation 3, as the examples below show.

To implement equation 3, the DSP in FIG. 5 must know the input signal envelope $E_{in}(t)$ as well as the required output signal $E_{out}(t)$. While the data content for the output $E_{out}(t)$ may be communicated to the processor from an external data source, the methods for obtaining $E_{in}(t)$ will be discussed below.

In this disclosure, when it is stated that "the DSP knows" a parameter or that the parameter "is known by the DSP" then this signifies that the DSP may be programmed to calculate the parameter from the data it receives from A/D converters and from other data passed to it. It is not necessary for the DSP to actually calculate the parameter or have it stored in one of its registers for the DSP to know the parameter. For example, it might be stated below that parameter B can be calculated given that parameter A is known by the DSP. The designer of the DSP being skilled in the art will then understand how to program the DSP to calculate parameter B. However, the designer may choose an algorithm which starts from the values passed to the DSP from the A/D converters but does not calculate parameter A as an interim value, if such an algorithm uses fewer steps than one which does explicitly calculate parameter A.

Figure 6:
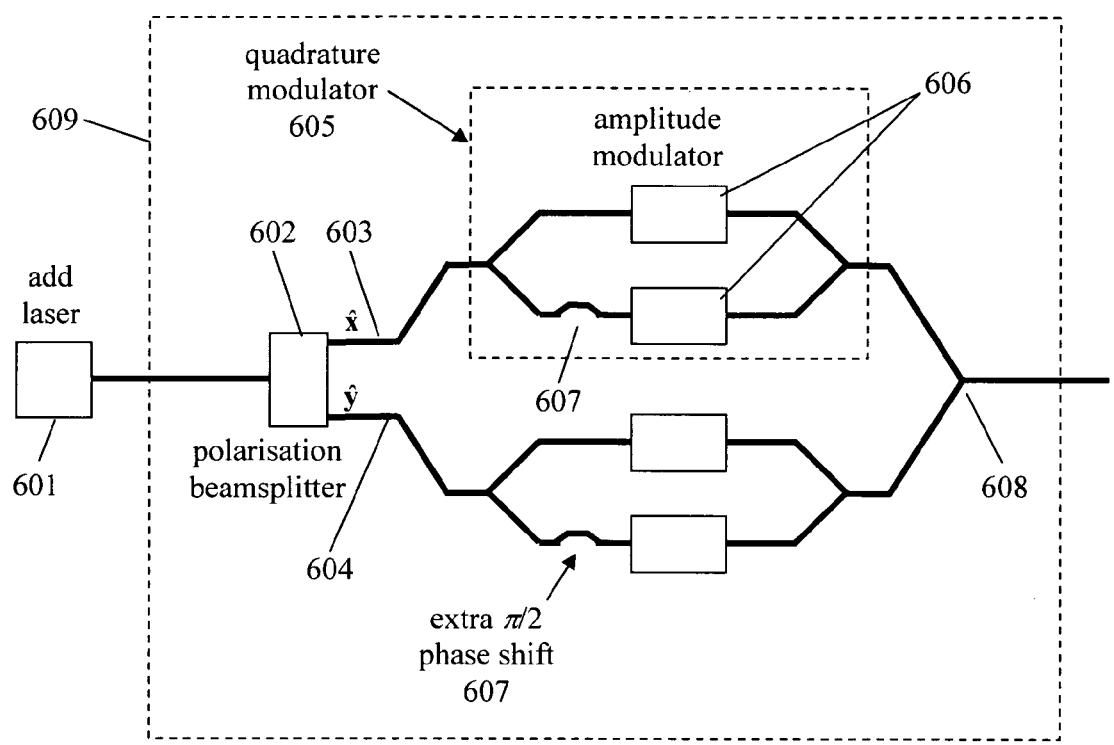
FIG. 6 illustrates an add laser followed by a modulation subsystem.

FIG. 6 illustrates an apparatus for modulating the add laser which works in the general case, when $E_{in}(t)$ and $E_{out}(t)$ comprise polarization multiplexed quadrature signals. The add laser 601 is polarized at 45°, so $$\hat{p}_{add} = \frac{1}{\sqrt{2}}\begin{pmatrix}1\\1\end{pmatrix}$$

The polarization beamsplitter 602 divides the laser power equally, so the top output 603 is horizontally polarized and the bottom output 604 is vertically polarized. The Jones matrix associated with the path from the polarization beamsplitter input to the top output is $$\begin{pmatrix}1 & 0\\0 & 0\end{pmatrix}$$

and from the input to the bottom output is $$\begin{pmatrix} 0 & 0 \\ 0 & 1 \end{pmatrix}$$

Each of the two polarization beamsplitter outputs are modulated by a quadrature modulator 605. Each quadrature modulator comprises a Mach-Zehnder configuration with an amplitude modulator 606 in each arm, and where one arm has a longer path length than the other by a whole number of wavelengths+½ (i.e., one arm has π/2 phase shift 607 compared to the other). The outputs of the two quadrature modulators are combined at 608 to give the output of modulation subsystem 609. The amplitude modulators in two arms of the top polarization beamsplitter output are driven by voltages from the D/A converters so as to produce modulation functions $M_{re,x}(t)$ and $M_{im,x}(t)$ respectively. They are zero-chirp modulators, so $M_{re,x}(t)$ and $M_{im,x}(t)$ are real quantities. The transfer function of the quadrature modulator configuration in the top polarization beamsplitter output path is therefore $M_{re,x}(t)+iM_{im,x}(t)$. Similarly the two modulators in the lower polarization beamsplitter output are driven to have transfer functions $M_{re,y}(t)$ and $M_{im,y}(t)$, and the net transfer function of the quadrature modulator is $M_{re,y}(t)+iM_{im,y}(t)$. Each amplitude modulator may be implemented as a zero-chirp Mach-Zehnder modulator. The transfer function of such a Mach-Zehnder modulator is of the form $\sin(\pi V/2V_\pi)$, where V is the input voltage to the modulator, and the values of the D/A converters are preferably chosen to take into account this nonlinear transfer function. The outputs of the two quadrature modulators are combined at a passive combiner stage. The overall transfer function of the modulator block is (aside from multiplicative constants for the loss of the split and combine elements, which can be absorbed into $L_{BA}$)

$$M_{add}(t)\hat{p}_{add} = \left[ \begin{pmatrix} 1 & 0 \\ 0 & 0 \end{pmatrix}(M_{re,x}(t)+iM_{im,x}(t)) + \begin{pmatrix} 0 & 0 \\ 0 & 1 \end{pmatrix}(M_{re,y}(t)+iM_{im,y}(t)) \right] \frac{1}{\sqrt{2}}\begin{pmatrix} 1 \\ 1 \end{pmatrix}$$

$$M_{add}(t)\hat{p}_{add} = \begin{pmatrix} M_{re,x}(t)+iM_{im,x}(t) \\ M_{re,y}(t)+iM_{im,y}(t) \end{pmatrix}$$

Hence values may be passed to the D/A converters to set $M_{re,x}(t)$, $M_{im,x}(t)$, $M_{re,y}(t)$ and $M_{im,y}(t)$ to give the required modulation function of equation 3.

The configuration of FIG. 6 may consist of separate fiber pigtailed components, provided attention is paid to the optical phase shifts between components. In the preferred embodiment of the present invention, an integrated version is built, such as in a planar waveguide technology. For example, the quadrature modulator and laser have been integrated in a gallium arsenide platform, as described in "10 Gb/s optical differential quadrature phase shift key (DQPSK) transmission using GaAs/AlGaAs integration" by R. A. Griffin et al. (OFC 2002 conference, Anaheim, US, paper FD6, 2002).

Many variations of the configuration shown in FIG. 6 are possible which allow the same result, to change an arbitrary signal $E_{in}(t)$ into an arbitrary $E_{out}(t)$. For add laser SOPs other than linear 45° it is trivial to find splitting arrangements that allow separate modulation of two orthogonal polarization components.

The amplitude modulators of FIG. 6 may be modulators which have chirp. Given that the chirp characteristic is known, it is possible to set the D/A voltage outputs to obtain an arbitrary modulation. The correct modulation function may be obtained if the two arms of the quadrature modulator do not have exactly π/2 phase difference, given that the phase difference is known by the DSP, and it is not close to 0 or π. The quadrature modulation function may be achieved using a combination of modulators other than a pair of modulators in arms of a Mach Zehnder configuration. For example, an amplitude modulator followed by a phase modulator provides the quadrature modulation function, but unless an endless phase modulator is used this combination does not offer endless phase adjustment, as is discussed below. Similarly, there are configurations of modulators other than the polarization diverse configuration of FIG. 6 which may achieve the required modulation function. For example, a sequence of two polarization modulators which operate on different polarization axes, an amplitude modulator and a phase modulator, may perform the task.

The configuration of FIG. 6 may also perform endless modulation of the phase and state of polarization. In alternate embodiments of the present invention, configurations may not offer endless phase and/or polarization modulation. This means that the output electric field envelope $E_{out}(t)$ takes on the desired value at all times t at the centre of a symbol, but there could be an occasional additional cycle of phase or polarization between adjacent symbol centers. It depends on the overall system design whether such extra cycles cause a degradation in performance. The extra cycles broaden the spectrum of the signal, which may cause crosstalk in a dense WDM channel plan. This may cause an impairment when combined with fiber propagation effects.

U.S. Patent Application Nos. 2004/0067064, 2004/0105682 and 2005/0007642 disclose optical transmitters where a laser is modulated by a modulation subsystem whose analog drive voltages are set by a digital signal processor via D/A converters. The modulation subsystems in these disclosures are capable of setting the inphase and quadrature parts of both states of polarization of the electric field envelope. These prior art disclosures are different from the present invention in that in the prior art disclosures the electric field envelope is chosen to precompensate for a fiber propagation impairment, whereas in the present invention the electric field envelope of the add signal is chosen to produce the desired output signal electric field envelope when the add signal is combined with the input signal.

A. Monitoring of Input and Output Signals

Figure 7:
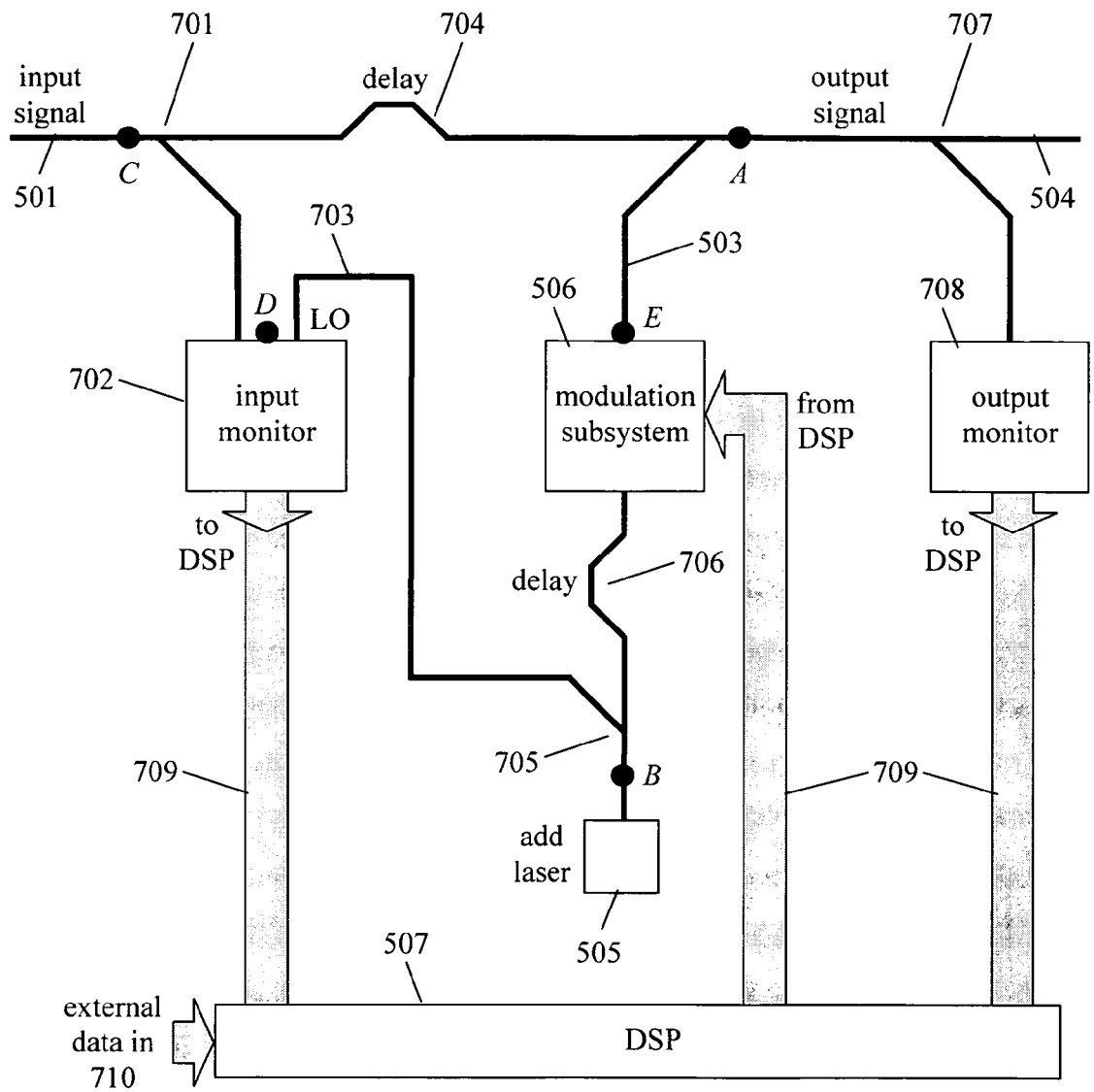
FIG. 7 illustrates input and output monitors fitting in a coherent channel substitution system.

As discussed above, the description of coherent channel substitution does not cover how the input signal electric field is known to the DSP. FIG. 7 illustrates an arrangement which adds monitors for the input and output signals to the apparatus of FIG. 5. The monitors tap light from the main optical fiber by splitters 701 and 707. The input monitor 702 and output monitor 708 are sampled coherent detection receivers. The local oscillator 703 for the input monitor is split from the add laser at splitter 705. The output monitor LO may or may not be split from the add laser. However, it is cost-effective to do this if the output monitor is at the same location as the add laser. (The connections from the DSP 507 to the input and output monitors and the modulation subsystem 506 are shown as gray strips with arrows 709. For simplicity of the diagrams, this notation is used in FIG. 7 and in later figures. The grey strip means that several analog voltages are read by the DSP via A/D converters or are set by the DSP via D/A converters. The direction of the gray arrow indicates whether voltages are set or read.) The input monitor allows $E_{in}(t)e^{i(\omega_{in}-\omega_{add})t+i(\phi_{in}(t)-\phi_{add}(t))}$ to be known by the DSP, through application of equation 2. If the add laser is used as the LO, then the output monitor allows the DSP to know the actual value of $E_{out}(t)e^{i(\omega_{out}-\omega_{add})t+i(\phi_{out}(t)-\omega_{add}(t))}$ and, after applying a phase estimate, the actual value of $E_{out}(t)$ (which may not be exactly the same as the desired values). Note that $E_{in}(t)e^{(\omega_{in}-\omega_{add})t+i(\phi_{in}(t)-\phi_{add}(t))}$ and the desired value of $E_{out}(t)e^{i(\omega_{out}-\omega_{add})t+i(\phi_{out}(t)-\phi_{add}(t))}$ are the quantities needed to calculate the add modulation function via equation 3.

If the coherent signal substitution arrangement is being used as part of an add-drop node, then the input monitor can also be the detector that receives the drop channel.

A data connection 710 is shown in FIG. 7 providing an input to the digital signal processor. This connection supplies the data values that constitute the information in $E_{out}(t)$. When the coherent channel substitution system is acting as a regenerator then the output data is taken from the input data, as discussed below.

There is a delay element 704 between the tap to the input monitor (point C) and the add coupler (A), and a delay element 706 between the add laser (B) and the add modulator subsystem (E). These optical delays may be implemented via optical fiber delay lines or delay lines in a planar waveguide platform. The first delay is present because the transit time from C to A has to match the processing delay, and realistically it takes time for the DSP to compute $E_{in}(t)e^{i\omega_{in}t+i\phi_{in}(t)}$, and time to calculate the required values of the D/A converters to obtain the required add signal modulation function. Let $\tau_{com}$ be the total time for an optical signal to cross point D, be detected, undergo computation, and modulation to be applied to an optical signal which travels to point E. Let the transit time for an optical signal from C to A be $\tau_{CA}$, and similarly for $\tau_{CD}$ and $\tau_{EA}$. The optical delay $\tau_{CA}$ should be such that $$\tau_{CA} \approx \tau_{CD} + \tau_{com} + \tau_{EA} \tag{4}$$

where the approximate equality sign means that the left hand and right hand sides of equation 4 correspond to within a small fraction of a symbol period. It may ease the design to make the optical delay longer than the expected processing delay, and to include an elastic buffer within the DSP which may be adjusted to make the delays match, and perhaps to have a clock phase adjustment on the clock controlling the D/A converters.

There is a delay between the add laser and the modulator in order to ensure that the phase of the add laser at a certain symbol in the input signal, as included in the measurement made by the input monitor, has not drifted when modulation is applied by the add laser modulation subsystem at that symbol. The requirement on the delays is $$\tau_{BE} \approx \tau_{com} + \tau_{BD} \tag{5}$$

where the approximate equality sign means that the left hand and right hand sides of equation 5 correspond to within a fraction of the coherence time of the add laser. The coherence time is 1/(add laser linewidth). This delay 706 can therefore be set with less accuracy than the first delay 704. If the add laser linewidth is sufficiently narrow, then equation 5 may be satisfied by the natural delay from B to E, without the need for a specific delay element.

If the optical delay between the input monitor and the add coupler is exactly known, if the optical connections in FIG. 7 are polarization maintaining, and if the characteristics of the add laser modulation stage are known, then equation 3 may be satisfied without an output monitor. In practice the phase lengths of the delays within the apparatus will not be initially known, and they will vary slowly with temperature. Additionally, the SOP of the add signal may drift compared to the optical signal to be substituted. An output monitor may deduce the errors in these phase lengths and SOPs and feed the result back to the part of the digital signal processor that computes the D/A values. In this document the optical phase and state of polarization of an optical signal may be referred to as basic parameters of the optical signal. The output monitor may also determine if any other parameters of the add laser modulation subsystem are in error and correct them, such as the phase difference between arms of the quadrature modulators, the frequency response of the modulation electro-optics, etc. The output monitor does not have to be located close to the add laser modulation subsystem. The output monitor could be located at a remote site downstream. For example, the sampled coherent detection operation at the receive end of the link may be used as the output monitor of FIG. 7 also. This may save equipment cost, but may mean that messages would have to be sent continuously between the receive site and the add site, and parameter changes within the add modulator subsystem that change too quickly could not be tracked.

FIG. 7 illustrates a preferred embodiment of the invention where the local oscillator for the input monitor sampled coherent detection unit is taken directly from the add laser. It is possible for the input monitor LO not to come directly from the add laser, provided that the phase and polarization relationship between the input monitor LO and the add laser is known by the DSP. In an alternative embodiment of the present invention, the LO for the input monitor is an independent laser, and there is an additional sampled coherent detection unit which beats the input monitor LO with the add laser to deduce the phase relationship between them and pass it to the DSP. In another alternative embodiment one or more frequency-stabilized octave-spanning optical combs are used. The LO for the input monitor is an independent laser and it is beat against a frequency-stabilized octave-spanning comb in a sampled coherent detection apparatus to find the phase relationship between the LO and a proximate line in the comb. The add laser is also beat against a frequency-stabilized octave-spanning comb to find the phase relationship between the add laser and a proximate line in the comb. The phase relationship between the add laser and the input monitor LO may then be deduced. The frequency-stabilized octave-spanning optical comb has been developed recently, and is described in "Optical frequency metrology," by T. Udem et al. (Nature, vol. 416, p. 233-237, 2002), incorporated herein by reference. It has the property that all spectral lines in the comb have an optical frequency which is an exact multiple of a known radio frequency and the spectral lines contain no phase noise.

FIG. 7 illustrates the output monitor in a preferred embodiment of the present invention. The output monitor in the preferred embodiment is a sampled coherent detection unit. The primary purpose of the output monitor is to provide an indication to the DSP when the optical phase or SOP of the add laser have departed from their intended values. It is possible to obtain such an indication using methods other than by sampled coherent detection, as is understood by those skilled in the art. In an alternative embodiment that is suitable for use with BPSK or QPSK signals, the output monitor contains a single detector which works in direct detection mode. The output monitor may also contain a passive optical bandpass filter to select only the WDM channel being substituted. The detected electrical spectrum contains a component at the symbol clock frequency, and by feeding the size of that component back to the DSP, it can be ensured that the DSP has the correct values for the add laser phase and SOP. When these values are correct the component of the detected electrical spectrum at the symbol clock frequency will be at a minimum, and a departure from the minimum indicates that the values are not correct.

By applying monitoring and add laser modulation that implements equation 3 exactly, the output signal is the desired signal $\text{Re}[E_{out}(t)e^{i\omega_{out}t+i\phi_{out}(t)}]$. In practice, the input monitor is not perfect and introduces noise and distortions due to the detector noise, finite A/D resolution, and other causes. Let the difference between the input signal recorded by the DSP and the actual input signal be Jones vector $n_{in}(t)$. Similarly, the output electric field of the add laser differs from that specified by the DSP because of finite D/A converter resolution and other effects. The difference between the actual and specified modulated add laser electric fields is denoted by $n_{out}(t)$. Thus, the actual output of the coherent channel substitution subsystem is $$\text{Re}[E_{out}(t)e^{i\omega_{out}t+i\phi_{out}(t)}+n_{in}(t)+n_{out}(t)]$$

The system is preferably designed so as to minimize the noise contributions $n_{in}(t)$ and $n_{out}(t)$ U.S. Patent Application No. 2005/0008369 discloses equipment for an add-drop node where the drop signal is observed by coherent detection and where light from the same laser that is modulated to make the add channel is used as the local oscillator for the coherent detection of the drop channel. This disclosure is substantially different from the present invention in that in the aforementioned patent application the drop channel is removed from the main fiber by a passive optical filter, while in the present invention the drop channel is removed by optical interference with the add channel.

B. Arrangements to Work with Simple Modulation Formats

The equipment depicted in FIG. 5 and FIG. 6 is capable of substituting a WDM channel where data is modulated on both inphase and quadrature components in both states of polarization. When simpler modulation formats are involved or when the resolution of the D/A converter is limited, alternative architectures may be used.

An example is the case where the input and output signals are on-off modulated single-polarization signals. Assuming no additive noise or distortion, the electric field takes on values of either $E_{on}\hat{p}$ (on state) or 0 (off state), where $E_{on}$ is a scalar constant and $\hat{p}$ is the Jones unit vector of the signal's SOP. Provided that the phase and SOP of the add laser are made to align with the input signal, the add signal electric field envelope needs to take on only three possible values: $-E_{on}$, 0 or $E_{on}$. A Mach-Zehnder modulator driven at $-V_\pi$, 0 and $V_\pi$ may provide this modulation. The required modulation of the add laser in this case may thus be applied by the apparatus shown in FIG. 8, which includes the Mach-Zehnder amplitude modulator 802, together with phase adjustment 801 and polarization adjustment 803 stages. Two D/A converters 804 are shown setting two analog voltages to control the phase adjustment and polarization adjustment stages, and in fact a different number of analog voltages may be needed, hence the small dots in FIG. 8. An advantage of the configuration of FIG. 8 over the configuration in FIG. 6 is that only the amplitude modulator needs to be driven at the symbol rate. The phase adjustment must be made with a response time much less than the coherence time of the add laser, and it must be endless. A quadrature modulator driven by periodic waveforms $\pi/2$ out of phase and an acousto-optic modulator are examples of components that may provide an endless phase shift. The polarization must be adjusted faster than the rate of change of the incoming signal SOP. An endless polarization adjuster may be made from a series of waveplates, as described in "Polarization control for coherent communications," by N. G. Walker & G. R. Walker (IEEE J. Lightwave Technol., vol. 8, no. 3, p. 438-458, 1990).

Figure 8:
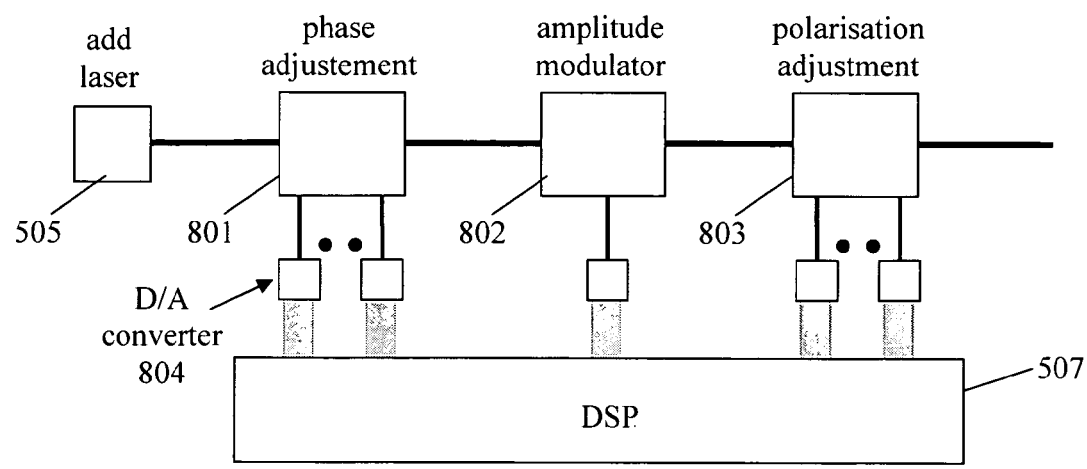
FIG. 8 illustrates an add laser with modulation subsystem for a simple modulation format case.

When the modulation format of the input and output optical signals is single polarization BPSK, then the add signal electric field envelope needs to take on only two values, $-E_{on}$ or $E_{on}$. The arrangement of FIG. 8 is suitable for this case also, where the amplitude modulator is driven at one of two voltages: $-V_\pi$ and $V_\pi$.

In a typical add-drop situation the incoming signal contains additive noise. The best solution with respect to optical transmission quality is to have a high resolution D/A converter driving the Mach-Zehnder modulator, and to set the D/A converter so as to cancel the incoming (drop) signal+noise, as well as insert the outgoing signal. The output signal then contains minimal noise in its inphase component. However, it may be preferable to use a low resolution D/A converter, perhaps because such a component costs less or is available with higher bandwidth. The lowest resolution D/A converter that can be used has the same number of states as the add signal, that is three states in the example of on-off modulated input and output signals, or two states in the example of BPSK modulated input and output signals. The add-drop function is successfully performed when the lowest allowable resolution D/A converter is used, but the additive noise on the input signal is transferred to the output signal. The transmission system design must then take into account that noise accumulates over the whole length of the link.

Figure 9:
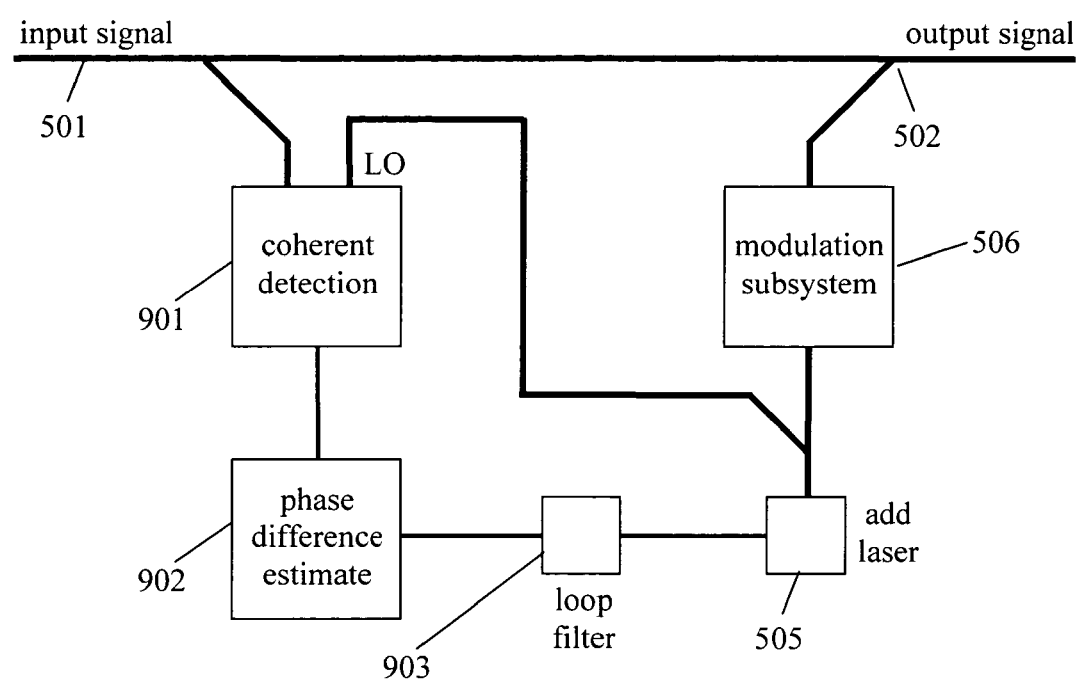
FIG. 9 illustrates a coherent channel substitution system using an add laser in a phase locked loop.

The apparatus of FIG. 7 has the endless phase adjustment separate from the add laser, and the add laser is free running. It is possible to effectively achieve endless phase adjustment by modulating the drive current to a semiconductor laser, or otherwise changing the laser optical frequency. FIG. 9 shows an arrangement using direct laser phase control which offers the same result as that of FIG. 7. This coherent channel substitution system is a different architecture to the one discussed above and depicted in FIG. 7. The add laser 505 in FIG. 9 is phase locked to the incoming signal 501 by direct modulation, that is in an optical phase locked loop (OPLL) configuration. The incoming signal and add laser (local oscillator) are mixed at 901 and unit 902 estimates the phase difference between them. Sampled coherent detection may be used to perform this operation, or a conventional hardware-based method may be used. The phase difference constitutes an error signal, which is then filtered by a loop filter function 903, and the result applied as modulation to the add laser. Again, if sampled coherent detection is used, the loop filter may be implemented within the DSP and the add laser modulation voltage set by a D/A converter, or conventional analog signal processing hardware may be used. The delay of the feedback loop must be much shorter than the coherence time of the add laser for the optical phase locked loop to function correctly. This constraint can force the use of an expensive narrow linewidth add laser. There is no such constraint on the time to calculate a phase estimate in the first architecture shown in FIG. 7, provided the delay $\tau_{BE}$ complies with equation 5.

C. Multiple Channel Architecture

Figure 10:
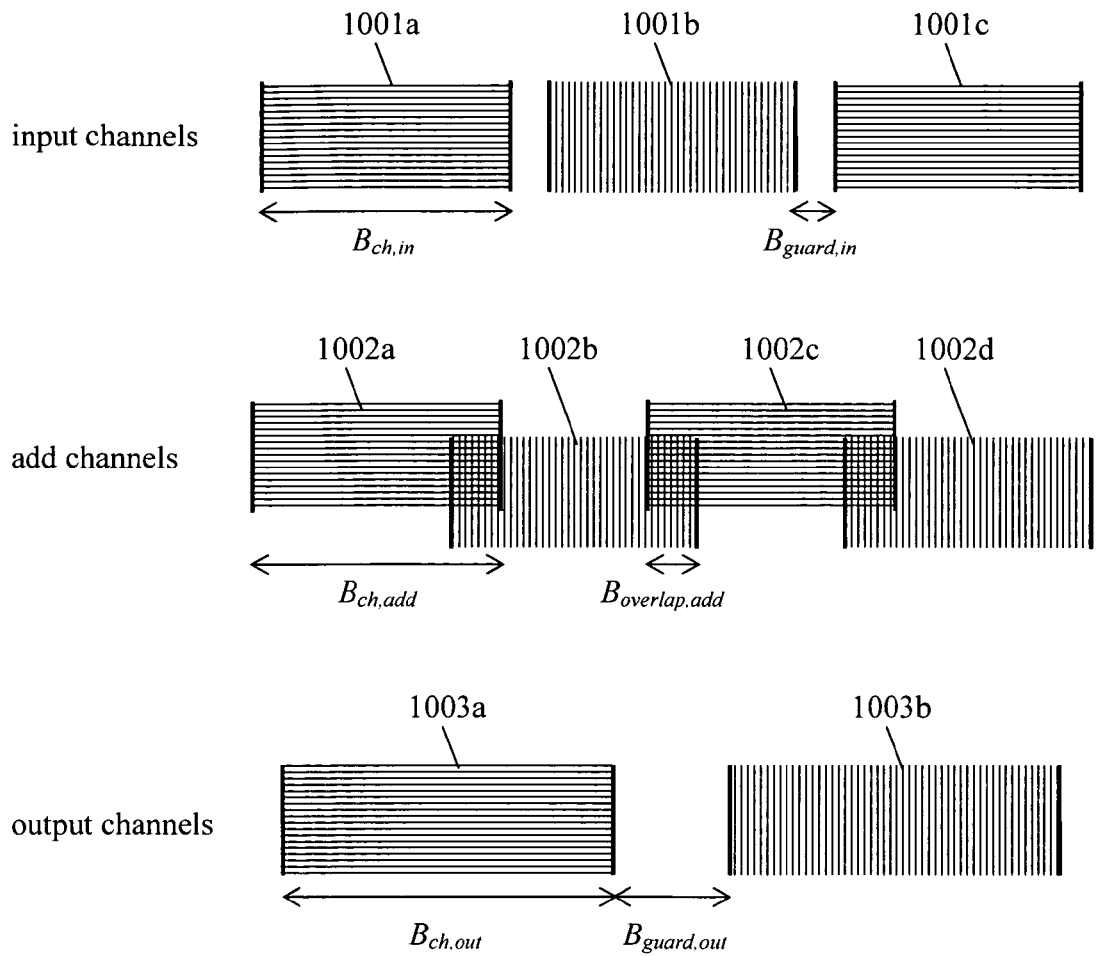
FIG. 10 provides an example of spectral occupancy of 3 input channels, 4 add channels and 2 output channels, in relation to the multiple WDM channel architecture of coherent channel substitution.

In the examples of coherent channel substitution described above, for every one WDM channel at the input, one add laser is used to make a single WDM channel at the output. If the monitor and modulation electro-optics have sufficient bandwidth, then several neighboring WDM channels at the input may be modified into several output channels by modulating a single add laser. In fact, the concept may be broadened so that $N_{in}$ neighboring input WDM channels are substituted by $N_{out}$ neighboring output WDM channels, by adding $N_{add}$ appropriately modulated add lasers; and where $N_{in}$, $N_{out}$ and $N_{add}$ are not the same number. Each modulated add laser occupies a certain bandwidth of optical spectrum. The combination of all the modulated add lasers must occupy a contiguous region of spectrum that covers all the $N_{in}$ input channels and all the $N_{out}$ output channels. FIG. 10 illustrates an example of optical spectral occupancy where $N_{in}=3$, $N_{out}=2$ and $N_{add}=4$. The horizontal direction in FIG. 10 represents increasing optical frequency. The input channels are blocks 1001; the add channels are blocks 1002, and the output channels are blocks 1003. If the bandwidth of an input channel is $B_{ch,in}$, and similarly $B_{ch,out}$ for the output and $B_{ch,add}$ for the modulated add channels; the guard bandwidth between input channels is $B_{guard,in}$, and similarly $B_{guard,out}$ between output channels; and the overlap bandwidth of neighboring add channels is $B_{overlap,add}$, then it is required that $$N_{add}B_{ch,add} - (N_{add}-1)B_{overlap,add} \geq N_{in}B_{ch,in} + (N_{in}-1)B_{guard,in}$$

and for the output channels (assuming they are centered on the input channels)

$$N_{add}B_{ch,add} - (N_{add}-1)B_{overlap,add} \geq N_{out}B_{ch,out} + (N_{out}-1)B_{guard,out}$$

Using a notation where the input WDM channel parameters are labeled with a subscript, so kth channel has electric field $\text{Re}[E_{in,k}(t)e^{i\omega_{in,k}t + i\phi_{in,k}(t)}]$, and similarly for the output and add channels, the combined input electric field is $$\text{Re}\left[\sum_{k=1}^{N_{in}} E_{in,k}(t)e^{i\omega_{in,k}t + i\phi_{in,k}(t)}\right]$$

The desired output electric field is $$\text{Re}\left[\sum_{k=1}^{N_{out}} E_{out,k}(t)e^{i\omega_{out,k}t + i\phi_{out,k}(t)}\right]$$

To obtain this desired output, the kth of the add lasers is modulated by a $M_{add,k}(t)\hat{p}_{add,k}$ product, such that $$\sum_{k=1}^{N_{add}} M_{add,k}(t)\hat{p}_{add,k} E_{add,k} L_{BA,k} e^{i\omega_{add,k}t + i\phi_{add,k}(t)} = \sum_{k=1}^{N_{out}} E_{out,k}(t)e^{i\omega_{out,k}t + i\phi_{out,k}(t)} - \sum_{k=1}^{N_{in}} E_{in,k}(t)e^{i\omega_{in,k}t + i\phi_{in,k}(t)} \quad (6)$$

in analogy with equation 3.

Figure 11:
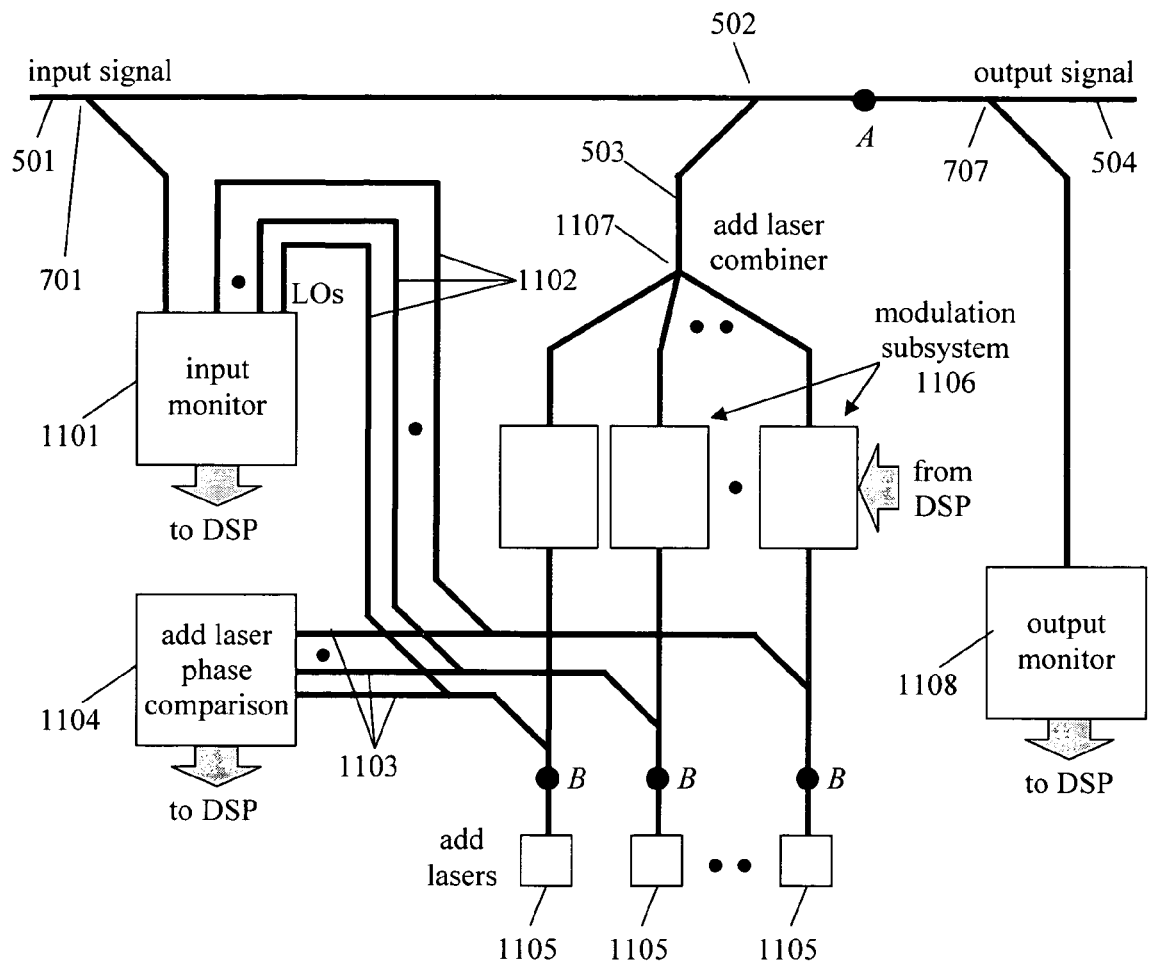
FIG. 11 illustrates an apparatus for coherent channel substitution using multiple add lasers.

The apparatus of FIG. 11 is able to perform coherent channel substitution for multiple wavelength channels. The apparatus contains the features of FIG. 7, with some of those features present multiple times. There are three add lasers 1105 shown in FIG. 11. Additionally, in alternate embodiments, there may be any number of add lasers. Copies of the add lasers 1103 go to the add laser phase comparison unit 1104, which uses sampled coherent detection to determine the phases of the add lasers with respect to one another. It is convenient mathematically to use one laser as the reference, such as add laser 1. The add laser phase comparison unit provides this information to the DSP $$(\omega_{add,k} - \omega_{add,1})t + \phi_{add,k}(t) - \phi_{add,1}(t) \text{ for } k=2\ldots N_{add}$$

The input monitor 1101 uses one or more sampled coherent detection units to record the combined input electric field. The local oscillators 1102 are provided by the add lasers. The number of sampled coherent detection units required depends on the bandwidth of the detection electro-optics and A/D converter, that is how much optical spectral bandwidth each sampled coherent detection unit can see. Even if several sampled coherent detection units are employed, and hence several add laser LOs, given that the phases of the add lasers relative to one another are known, the input electric field compared to add laser 1 may be recorded within the DSP as $$\sum_{k=1}^{N_{in}} E_{in,k}(t)e^{i(\omega_{in,k} - \omega_{add,1})t + i(\phi_{in,k}(t) - \phi_{add,1}(t))}$$

The add lasers each send light into a modulation subsystem 1106 in a similar fashion as that for the single add laser case, having modulation function $M_{add,k}(t)\hat{p}_{add,k}$. The modulated outputs are combined in the add laser combiner 1107. Point A and several points B are marked in FIG. 11, associated with several values of $L_{BA,k}$.

The function of the output monitor is to feed back values of parameters in the modulation subsystems, as in the single wavelength case. Preferably, the output monitor 1108 comprises a number of sampled coherent detection units whose local oscillators may be provided by the add lasers like the input monitor. In an alternative embodiment, the output monitor is a single sampled coherent detection unit and has one local oscillator which tunes in wavelength. By moving the LO between wavelengths so as to cover the whole of the relevant optical bandwidth, information may be obtained about the deviation of each of the add lasers in optical phase or SOP from the value assumed by the DSP. The LO must rove sufficiently quickly to avoid a substantial drift in optical phase or in SOP from any one add laser.

Figure 12:
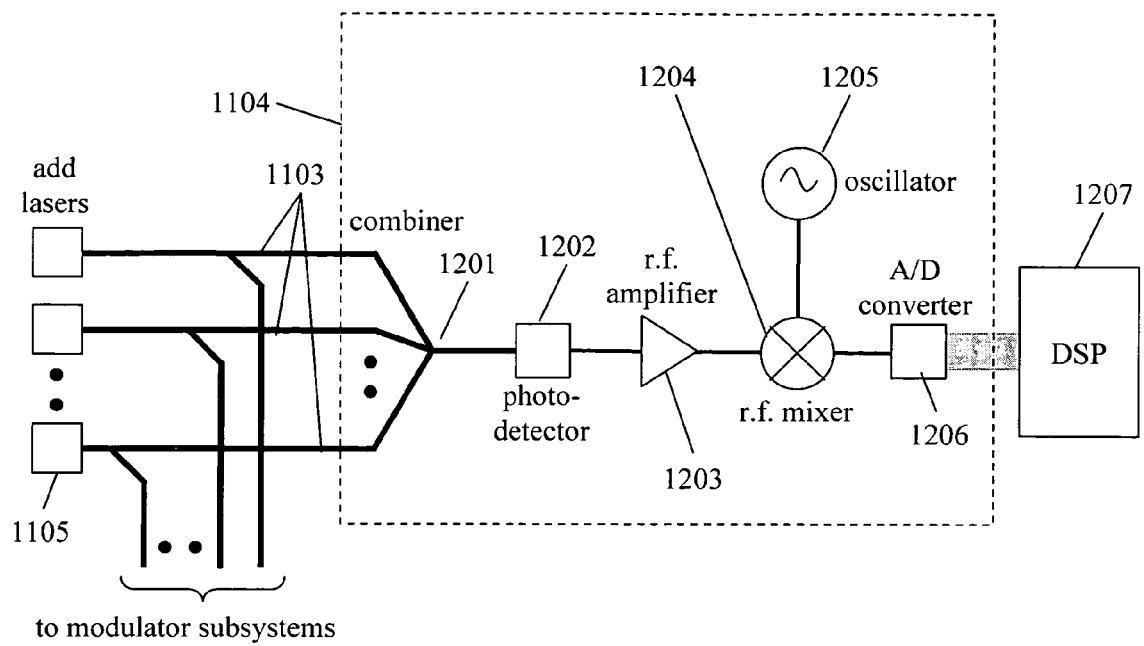
FIG. 12 illustrates a simple configuration for add laser phase comparison unit.

FIG. 12 illustrates a preferred embodiment of the add laser phase comparison unit. The configuration of FIG. 12 provides a simple way to implement the sampled coherent detection operation to obtain the add laser phases relative to one another. Light from the add lasers 1103 is combined in the passive combiner 1201 and then detected in the single photodetector 1202 and optionally amplified at 1203. The spectral spacing between the add lasers is staggered, so that there are $N_{add}-1$ distinct tones in the photocurrent of the photodetector at frequencies close to the average difference frequency (plus other higher frequency beat products that are filtered out). The beat products may then be downshifted using a radio frequency (r.f.) mixer 1204, so that the single A/D converter 1206 has a lower bandwidth and is run at a lower sampling rate than if the r.f. mixer were absent. The DSP 1207 is able to extract the phase and frequency information of the add lasers relative to one another based on the phase and frequency of the different beat tones, together with the frequency of the oscillator 1205 that drives the r.f. mixer.

Figure 13:
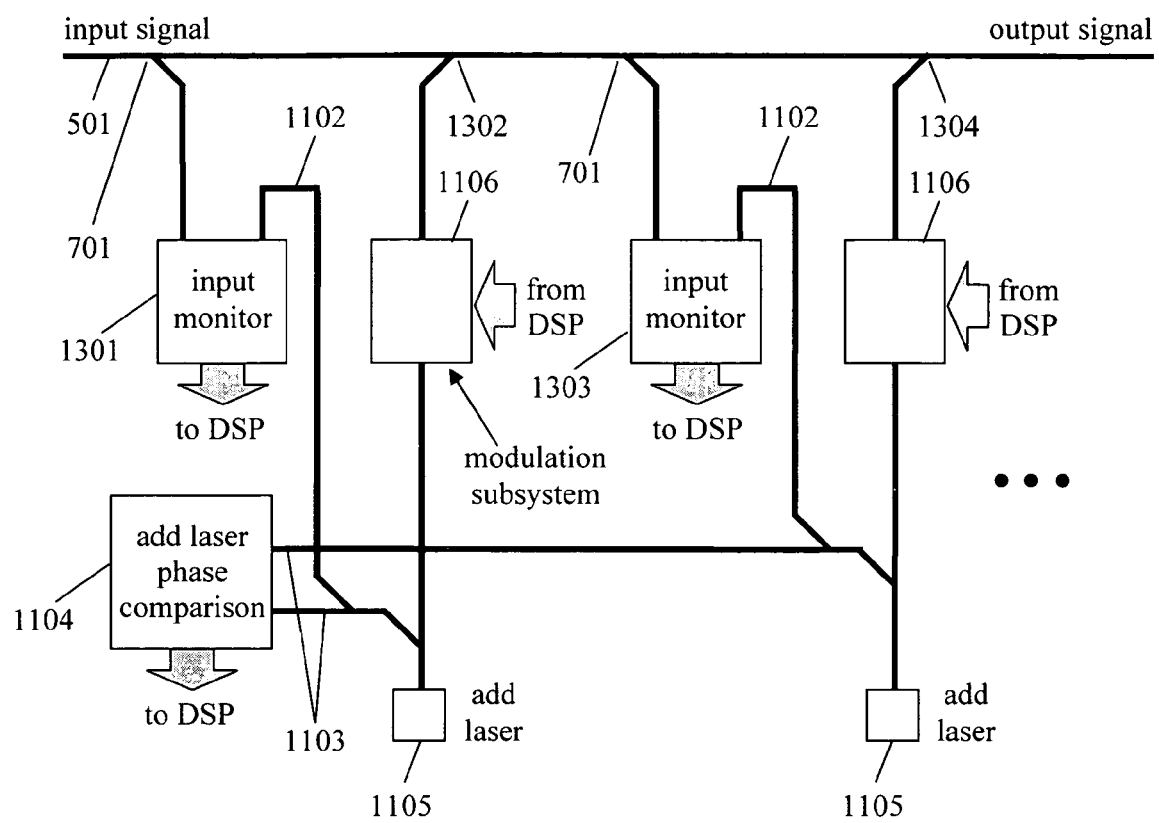
FIG. 13 illustrates an alternative embodiment of a multiple channel coherent channel substitution configuration.

FIG. 11 can be considered as a high level diagram showing the elements needed to implement coherent channel substitution with multiple wavelength channels. In fact there are many ways to arrange the different elements so that the DSP may calculate modulation functions for the add lasers and the appropriate modulation may be applied. Solutions are possible where the functions represented by the blocks in FIG. 11 are separated and grouped in other ways. For example, FIG. 13 shows an architecture which appears different from that of FIG. 11, where the input monitor function and the add laser combiner function are implemented in a distributed manner. There are two add laser combiners 1302 and 1304, and two input monitors 1301 and 1303 in the example of FIG. 13. All the solutions have the following in common: the digital signal processor has knowledge of the phases of the add lasers with respect to one another, the electric fields of the input WDM channels with respect to the add lasers and the desired output electric field with respect to the add lasers; and the digital signal processor acts on modulation components via D/A converters so that the electric field of the modulated add lasers which superimposes on the input electric field is able to effect the required channel substitution. The second input monitor 1303 in line sees a signal which is different from the input signal 501 in that a portion of the optical spectrum has been replaced by coherent interference at the first combiner 1302. The signal seen by this input monitor partially corresponds to the input signal 501. The DSP may know the input signal electric field envelope by assembling data from all the input monitors, even if the individual input monitors see signals which only partially correspond to the input signal. Similarly, the output monitor may be distributed, and the individual output monitors may see signals which partially correspond to the output signal 504. It is possible for a sampled coherent detection unit to perform the rôle of both an input monitor and an output monitor.

To calculate the $N_{add}$ different $M_{add,k}(t)\hat{p}_{add,k}$ functions, the spectrum of the composite input and desired output electric field is divided into sections. A one-sided stitching function $G_{os}(\omega)$ is chosen which has the property that $$G_{OS}(\omega) = 1 \qquad 0 \leq \omega \leq \pi(B_{ch,add} - 2B_{overlap,add}) \qquad (7)$$
$$G_{OS}(\omega) = 1 - G_{OS}(2\pi(B_{ch,add} - B_{overlap,add}) - \omega) \quad \pi(B_{ch,add} - B_{overlap,add}) < \omega \leq \pi B_{ch,add}$$
$$G_{os}(\omega) = 0 \qquad \omega > \pi B_{ch,add}$$

The raised cosine family of functions are examples of functions which comply with equation 7. Out of $G_{os}(\omega)$ three two-sided stitching functions are formed. The low frequency add laser uses $G_l(\omega)$, where

| | |
|---|---|
| $G_l(\omega) = 1$ | $\omega < 0$ |
| $G_l(\omega) = G_{os}(\omega)$ | $\omega \geq 0$ |

The high frequency add laser uses $G_h(\omega)$

| | |
|---|---|
| $G_h(\omega) = G_{os}(-\omega)$ | $\omega \leq 0$ |
| $G_h(\omega) = 1$ | $\omega > 0$ |

The intermediate add lasers use $G_m(\omega)$

| | |
|---|---|
| $G_m(\omega) = G_{os}(-\omega)$ | $\omega < 0$ |
| $G_m(\omega) = G_{os}(\omega)$ | $\omega \geq 0$ |

Figure 14:
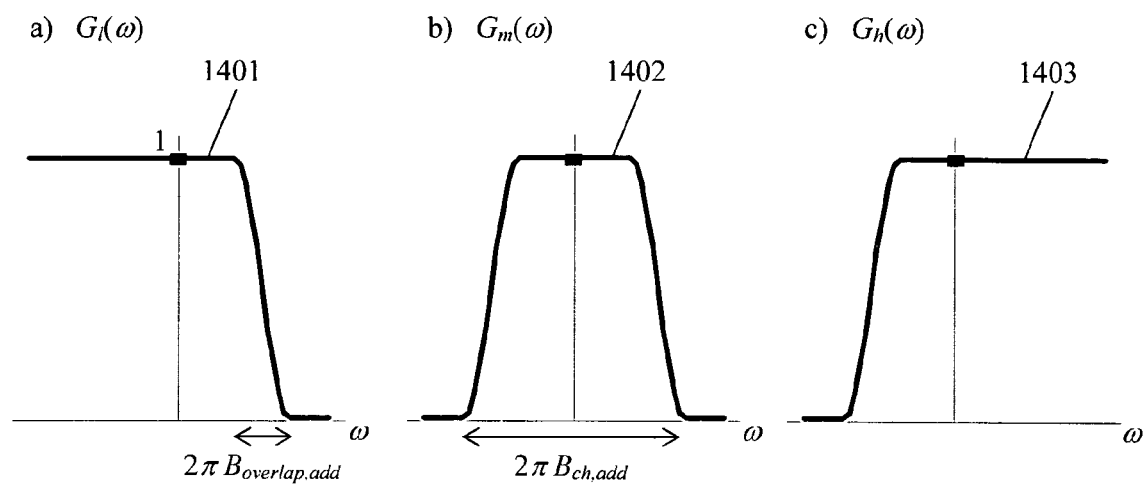
FIG. 14 illustrates possible stitching functions for the low optical frequency channel, intermediate channels, and the high optical frequency channel.

Examples of the three two-sided stitching functions are given in FIG. 14. FIG. 14a shows a possible shape of the transfer function 1401 versus optical frequency $G_l(\omega)$; FIG. 14b shows the transfer function 1402 $G_m(\omega)$; and FIG. 14c shows the transfer function 1403 $G_h(\omega)$. They have the required property that the sum of the $N_{add}$ stitching functions, frequency shifted by the respective add laser centre frequency, is flat and equal to 1.

The spectrum required of an add laser, the Kth add laser for example, after modulation is given by multiplying the Fourier transform of the required electric field difference on the right hand side of equation 6 by the appropriate stitching function $G_K(\omega)$ (which is one of $G_l(\omega)$, $G_m(\omega)$ or $G_h(\omega)$ depending on whether K is a low, middle or high frequency channel). This operation is equivalent to the operation in the time domain of convolving the required electric field difference with the stitching function's impulse response $g_K(t)$, the inverse Fourier transform of $G_K(\omega)$. The required modulated output of the Kth add laser is therefore $$\left( \sum_{k=1}^{N_{out}} E_{out,k}(t) e^{i\omega_{out,k} t + i\phi_{out,k}(t)} - \sum_{k=1}^{N_{in}} E_{in,k}(t) e^{i\omega_{in,k} t + i\phi_{in,k}(t)} \right) \otimes g_K(t)$$

which is obtained by a modulation function $$M_{add,K}(t)\hat{p}_{add,K} = \frac{\left( \sum_{k=1}^{N_{out}} E_{out,k}(t) e^{i(\omega_{out,k} - \omega_{add})t + i(\phi_{out,k}(t) - \phi_{add}(t))} - \sum_{k=1}^{N_{in}} E_{in,k}(t) e^{i(\omega_{in,k} - \omega_{add})t + i(\phi_{in,k}(t) - \phi_{add}(t))} \right) \otimes g(t)}{E_{add} L_{BA}}$$

The convolution operation may be performed in the DSP as a finite impulse response filter. Only a subset of the $N_{in}$ input channels and $N_{out}$ desired output channels will contribute to the result for a given add laser, and so the others may be omitted from the sums. The voltages to deliver to the modulation subsystem are obtained from $M_{add,K}(t)\hat{p}_{add,K}$ in the same way as for a the single channel case.

D. Configurations Using Coherent Channel Substitution

There are several configurations in a fiber optic transmission network where coherent channel substitution may be employed. Some of these configurations are listed below.

1. WDM Add-Drop

Figure 1:
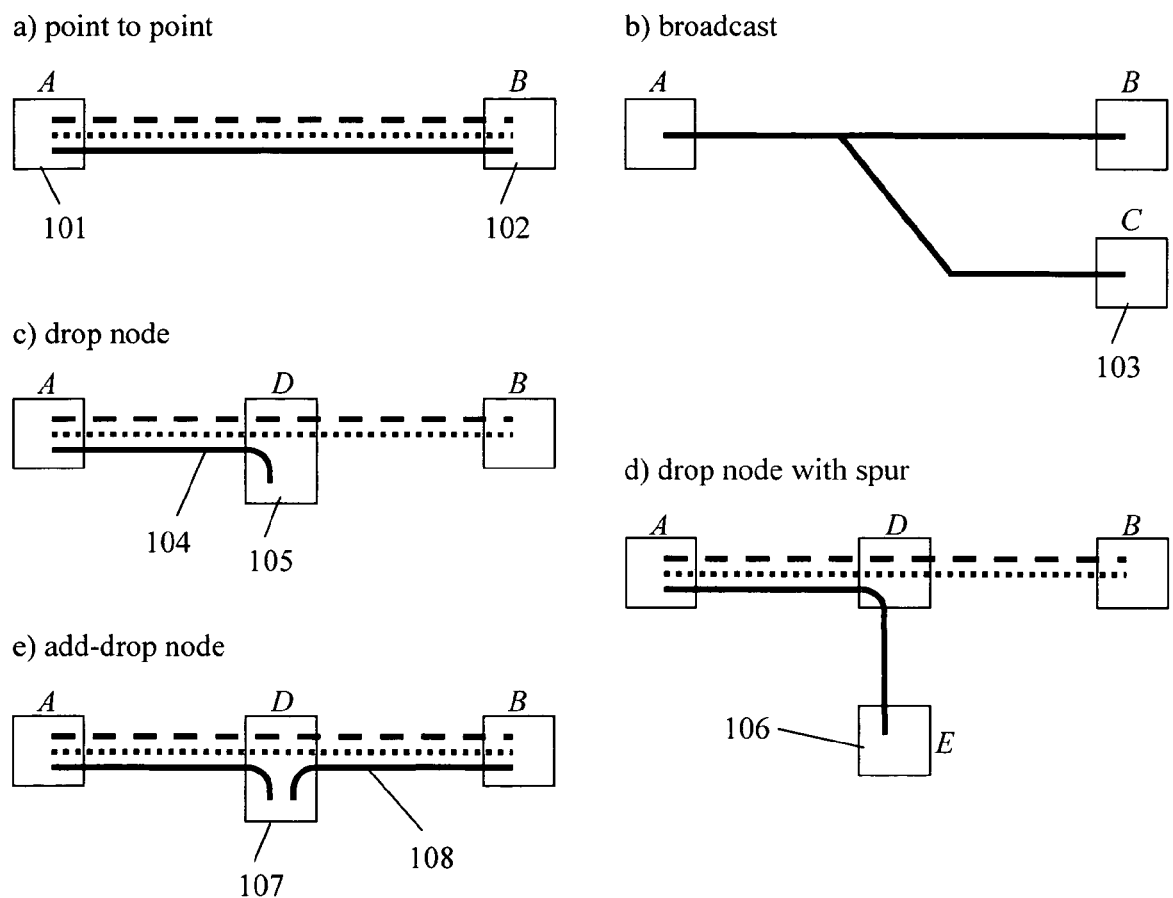
FIG. 1 (Prior Art) illustrates five different WDM network topologies (point-to-point, broadcast, drop node, drop node with spur, and add-drop node) with dashed, dotted and solid lines representing three different wavelengths.
Figure 2:
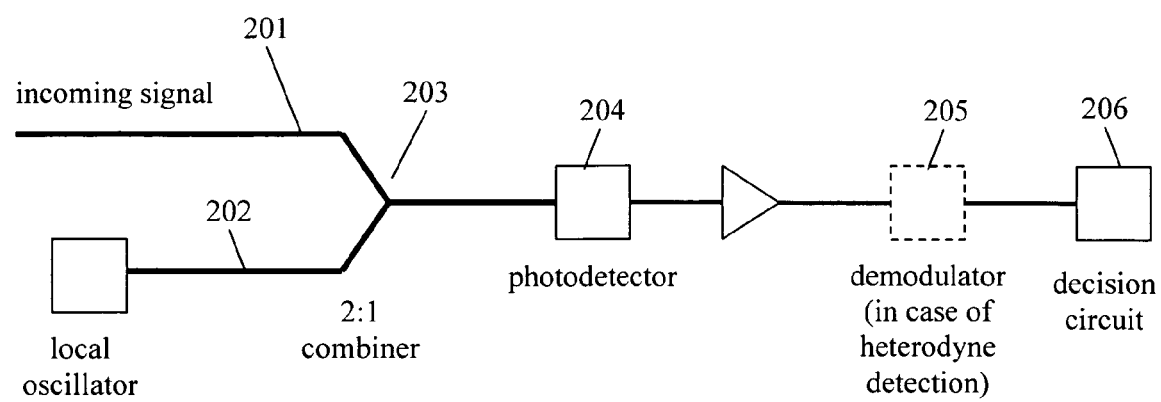
FIG. 2 (Prior Art) illustrates a coherent receiver.
Figure 3:
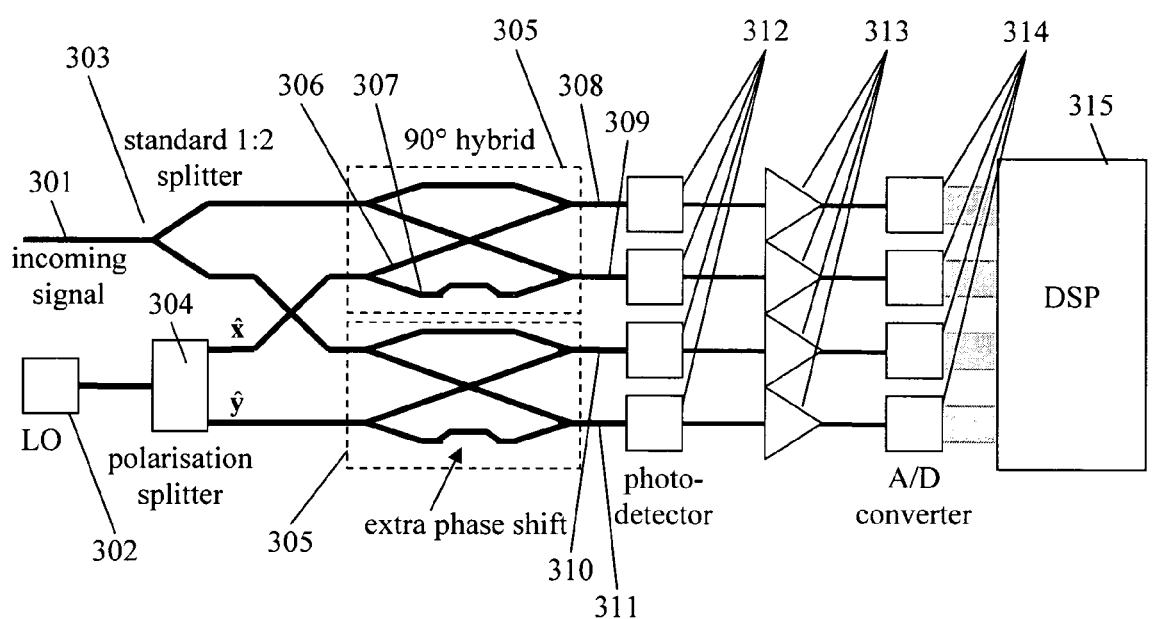
FIG. 3 (Prior Art) illustrates a polarization and phase diverse configuration for sampled coherent detection.
Figure 4:
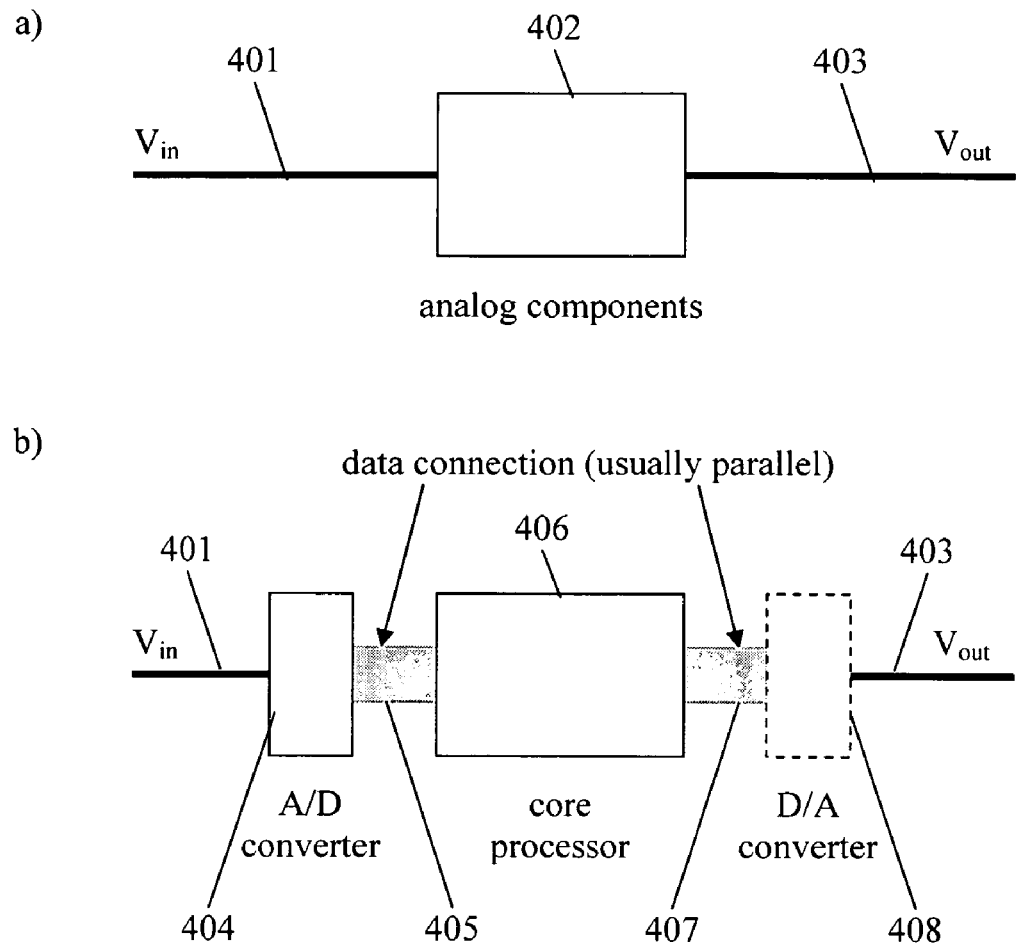
FIG. 4 (Prior Art) illustrates generic diagrams of an analog signal processor and a digital signal processor.

In this case one WDM channel is dropped at a node and another channel of the same wavelength is added. Multiple channels may be added or dropped. The main add-drop functions, that is the input monitor and add channel modulation of FIG. 7, may be located at the add drop node as in FIG. 1e, or at the end of a spur such as is depicted in FIG. 1d. The length of the spur cannot be so long that the delay $\tau_{CA}$, as specified by equation 4, becomes unmanageable.

The output signal may be a different modulation format or symbol rate from the incoming signal. The bandwidth of the D/A converters and electro-optics in the add laser modulation subsystem must be wide enough to cope with the higher of the symbol rates of the input signal and output signal. If the channel to be added has a higher symbol rate than the channel dropped, then there must be sufficient spectral bandwidth between any neighboring channels to accommodate the new higher bandwidth channel.

2. WDM Drop Only

In some applications of a drop node, as drawn in FIG. 1c, it may be required that the signal continuing towards the receive end of the link be extinguished. This would be a requirement if there is an add node downstream at the same wavelength which is of a simple design using only a tap coupler to add the new signal, i.e. without hardware for another coherent channel substitution operation. Alternatively, it may be required to remove the superfluous signal to reduce the optical power level so as to save on the cost of downstream optical amplification or to reduce the crosstalk experienced by the remaining useful WDM channels.

The extinction of the drop channel may be achieved with the coherent channel substitution arrangement by setting $$E_{out}(t)=0$$

3. Digital Regenerator

The purpose of digital regenerator is to receive a digital signal after it has experienced additive noise and/or distortion, to make a decision which digital symbol value was sent for each symbol slot, and then transmit a sequence of clean symbol values free of noise and distortion. If the digital signal is encoded by a forward error correction (FEC) code, then the regenerator can decode the FEC to get a better estimate of the true symbol values, and subsequently transmit those values in FEC encoded form. In addition, a digital regenerator may modify overhead bits, for example to record the number of bit errors it has counted.

The digital regenerator function for a WDM channel may be implemented as a variation of the WDM add-drop case, where the information to be added is the same as the information dropped.

The coherent channel substitution process may implement a useful compensation feature for fiber propagation effects beyond what may be done by a conventional digital regenerator. With some fiber optic transmission systems the fiber propagation effects are managed, for example using chromatic dispersion compensation, such that the signal appearing at the receive end is sufficiently undistorted to detect it with low bit error rate (BER). However, the signal may be strongly distorted if observed at intermediate locations. This signifies that the fiber propagation management scheme may have to be modified to insert a regenerator at an intermediate point. With the coherent channel substitution regenerator the appropriate compensation for the accumulated propagation effects from the transmitter to the regenerator site may be applied after detection within the DSP. Then another transform may be applied before calculating the D/A converter values, so that the signal that leaves the regenerator is predistorted to take into account the path from the regenerator site to the receiver, but is in other respects a regenerated signal. The signal that arrives at the receive end of the link thus shows minimal distortion.

4. Tributary Add-Drop

A high bit rate signal is typically composed of many tributaries. These may be organized within the signal as packets, that is contiguous blocks of bits; by time interleaving of bits or bytes; or as part of a complex multiplexing structure, such as plesiochronous digital hierarchy. It may be required to perform an add-drop operation on some tributaries of a WDM signal, and leave other tributaries to continue. This operation may be performed by extracting the drop tributary information from the drop channel detector, and calculating $E_{out}(t)$ so that it contains the required through tributaries and add tributaries.

5. Optical Phase Lock

There are applications where one laser, the slave, is to be made to have an optical frequency and optical phase that follows another laser, the master. Usually this is done via an optical phase locked loop. An OPLL was described above, as a component of an alternative configuration to achieve coherent channel substitution. It was noted that an OPLL is difficult to implement. It comprises a feedback loop which must have a short delay time and wide bandwidth. This forces the use of expensive components, and may prohibit using DSP technologies.

Figure 15:
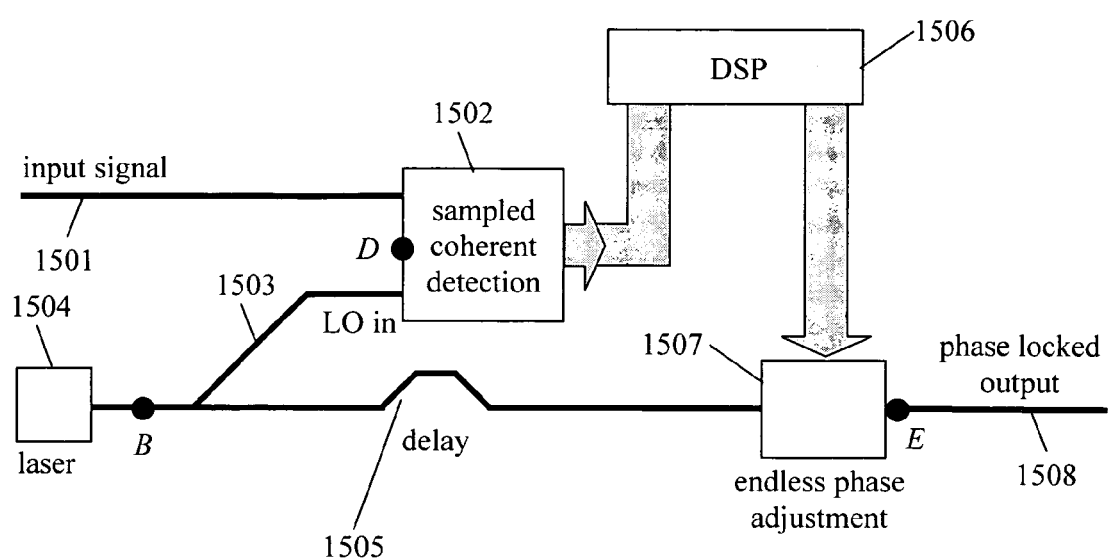
FIG. 15 illustrates an apparatus to achieve optical phase locking.

The coherent channel substitution method, excluding the option described above using an OPLL, provides an alternative way to achieve optical phase lock. The apparatus to achieve phase lock is illustrated in FIG. 15. There is no feedback loop, so this method cannot be classed as a phase locked loop. However, it does achieve the phase lock condition. The fact that there is no feedback eases the design, since it is the tight tolerances of the feedback loop that makes an OPLL difficult to implement. Some light from laser 1504 is used as a local oscillator 1503 for the sampled coherent detection unit 1502 which observes the input signal (the master) 1501. The DSP 1506 receives information from the sampled coherent detection unit, and then controls the endless phase adjustment 1507, which modifies the phase of light from the laser. The output 1508 of the endless phase adjustment is the phase locked output, a slave of the input. In this embodiment of the present invention there is no need to combine this signal with the input signal as there was for the previous embodiments. The arrangement of FIG. 15 is the same as that of FIG. 7 where the connection in the main fiber from the input monitor splitter 701 to the combiner 502 has been removed. Laser 1504 has the same rôle as the add laser 505, and the endless phase adjustment 1507 has the same rôle as the modulation subsystem 506 of FIG. 7. The laser is made to have a c.w. output that is phase locked to the input by setting $$M_{add}(t)\hat{p}_{add} = (\text{constant})e^{i(\omega_{in}-\omega_{add})t+i(\phi_{is\,in}(t)-\phi_{add}(t))}$$

where $M_{add}(t)\hat{p}_{add}$ is here the transfer function of the endless phase adjustment. The constraint on time delays of equation 5 still applies, to within a small fraction of the laser coherence time.

$$\tau_{BE} \approx \tau_{com} + \tau_{BD} \qquad (5)$$

This is the reason for the delay 1505. The input signal can be modulated or c.w. The DSP makes use only of the recovered phase information $(\omega_{in}-\omega_{add})t+\phi_{in}(t)-\phi_{add}(t)$, and does not use the amplitude information in the case where the input signal is modulated.

U.S. Pat. No. 6,810,048 discloses an apparatus to achieve optical phase lock where a sideband to the slave laser optical frequency is generated by a single sideband modulator, and the frequency offset and phase of the sideband is controlled to be phase locked to the input signal master. This patent does not explain how the sideband frequency and phase are controlled to be phase locked to the master, but discloses that the sideband offset frequency is generated by a microwave oscillator. It is apparent from this patent that the sideband offset frequency must be a certain minimum value, since an electrical 90° hybrid driven at the offset frequency is used within the single sideband modulator, and such a component is not available that operates down to 0 Hz offset. In the aspect of the present invention where it is used to generate a phase locked optical slave signal, the endless phase adjustment 1507 is not driven by an oscillator. Instead it is driven by one or more analog voltages that are calculated by the DSP based on the phase difference between the laser 1504 and the input signal. To understand that these analog voltages cannot be considered to have come from an oscillator, the case where the phase difference between the laser and the input signal does not change over a period of time is considered. In that case the analog voltages driving the endless phase adjustment is constant over that period of time in consequence. U.S. Patent Application No. 2004/0208643 also discloses a way to phase lock the sideband of an optical carrier to a master input signal. In that disclosure a feedback loop configuration is used, which is similar to the standard method of achieving optical phase lock and is distinct from the present invention, which does not use feedback.

6. High Bandwidth Waveform Generation

Figure 16:
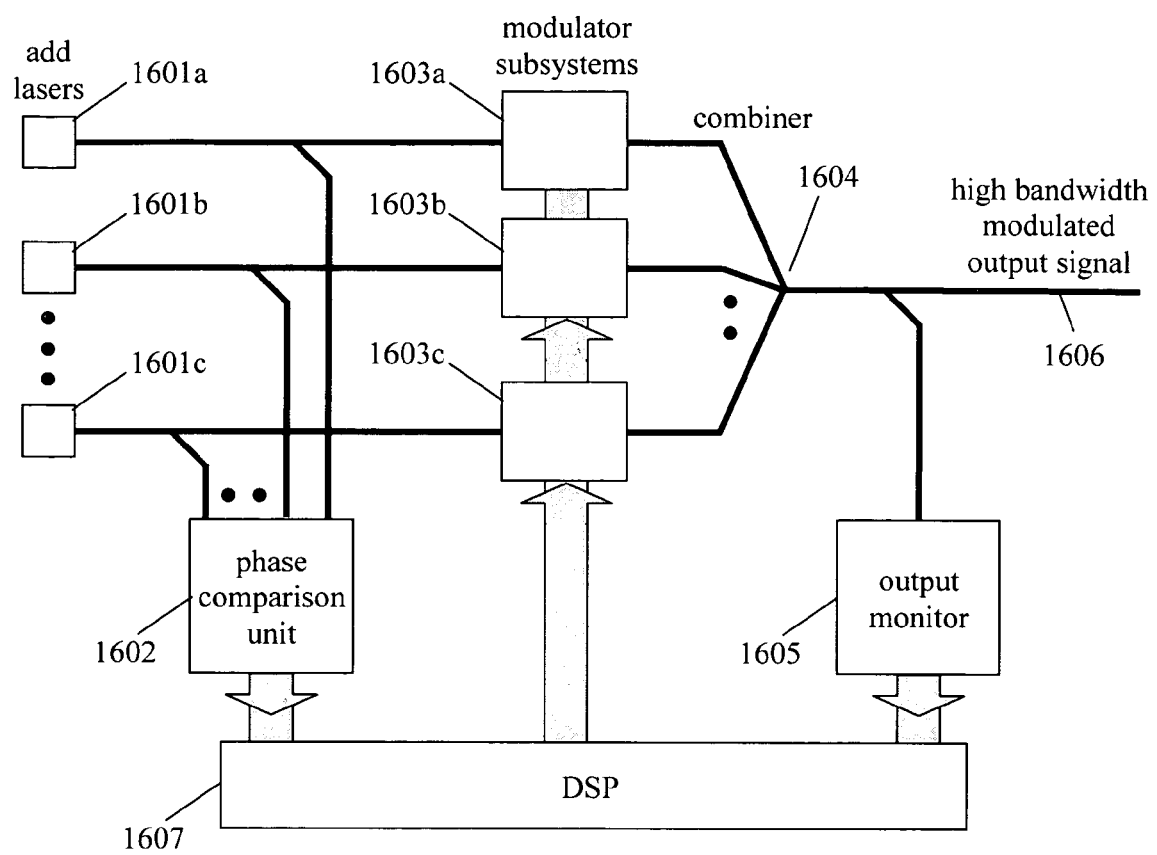
FIG. 16 illustrates a configuration to synthesize a high bandwidth signal from multiple modulated laser sources.

To generate an optical signal modulated with a rapidly varying envelope normally requires a high bandwidth optical modulator. Coherent channel substitution offers an alternative way, by modulating several carriers with different parts of the required total optical spectrum, and then combining them. Each carrier requires a correspondingly lower bandwidth modulation subsystem. If the desired output signal envelope is $E_{out}(t)$, then the multiple channel architecture of coherent channel substitution is implemented per equation 6 with $$E_{in,k}(t)=0$$

for all k. The components to combine the input signal with the modulated add signals are not needed, as shown in FIG. 16. Add lasers 1601 are each modulated by a modulation subsystem 1603, whose outputs are combined in combiner 1604 to form the output high bandwidth waveform 1606. Some light from the add lasers is delivered to a phase comparison unit 1602, which uses sampled coherent detection so that the DSP 1607 can determine the phases of the add lasers with respect to one another. The DSP sets the analog voltages of the modulation subsystem in accordance with equation 6 as described above. The output monitor 1605 has the same function as discussed in relation to the output monitor of FIG. 11.

The configuration of FIG. 16 is similar to FIG. 11 where the input signal, the input signal monitor, and the main fiber up to the point of combination with the add laser light are not present. Additionally, the configuration of FIG. 16 is similar to the basic configuration of FIG. 5, with the first branch of the combiner 1604 being considered as containing the input signal 501, and the remaining branches of the combiner 1604 after being combined corresponding to combiner 502.

This approach allows an arbitrary signal envelope to be generated. The carrier still contains phase noise, which may be set to be equal to the phase noise of any one of the add lasers. Alternatively, if the phases and frequencies of the add lasers are known compared to one of the lines in a frequency-stabilized octave-spanning optical comb, then the waveform that is synthesized may be made to have an exact centre frequency compared to the reference radio frequency without phase noise. The optical carrier is then locked to the envelope. The phases of the add lasers may be found by beating at least one of them with the octave-spanning comb in a sampled coherent detection operation, or by using lines filtered from the comb in place of the add lasers.

E. Optical Domain Encryption

Figure 17:
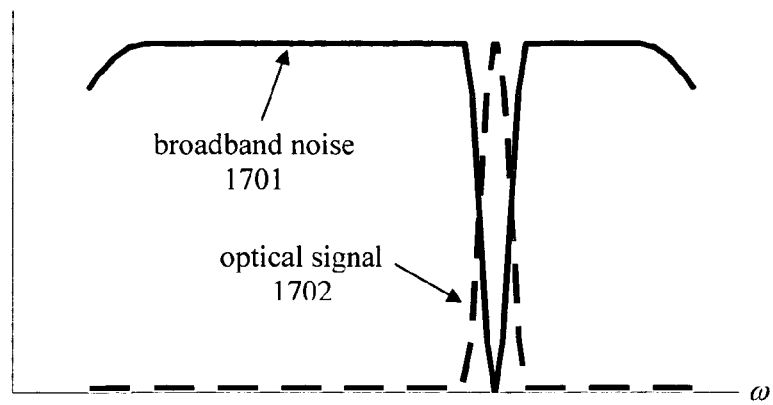
FIG. 17 illustrates the notch in the spectrum of broadband optical noise (solid line) carved by coherent channel substitution, together with the spectrum of the corresponding inserted signal (dashed line)

The secret optical communications aspect of the present invention is implemented by using the apparatus of FIG. 7 where the input signal is light from a broadband optical noise source, and the substituted WDM channel contains the information to be securely transmitted. At all points downstream the spectrum of the light appears broad and flat, as if it consisted entirely of optical noise. The coherent channel substitution method may effectively carve a notch in the noise spectrum that is the correct shape for the information-bearing signal, and then insert the signal in its place. FIG. 17 illustrates the spectrum 1701 of the optical noise effectively after a notch has been carved, and the spectrum 1702 of the channel to be added. Since broadband optical noise sources are available with 4000 GHz bandwidth, and a conventional 10 Gb/s optical signal occupies about 10 GHz bandwidth, the optical signal becomes hard to identify out of the numerous "noise" channels. Furthermore, the information-bearing channel may undergo frequency hopping, so that the eavesdropper must continually reidentify it to extract any information. The information-bearing channel may be disguised to appear similar to a spectral slice of optical noise. This combination of features make it unfeasible for an eavesdropper to obtain the transmitted information. The frequency hop plan and the exact algorithm used to disguise the information to appear like noise are derived from the secret key. The intended recipient, who knows the key, can then read the information.

In a preferred embodiment of the present invention, the broadband optical noise source is implemented by an optical gain medium without feedback (i.e., an optical amplifier with a terminated input). Alternative optical noise sources may be used, for example based on supercontinuum generation. Any source of apparently random electric field over a broad optical spectrum may be used as the optical noise source. The DSP executes the coherent channel substitution via equation 3 where the electric field envelope $E_{out}(t)$ is set to equal the desired envelope to carry the data (modified by the noise-rendering function described below). $\omega_{in}$ and $\omega_{add}$ are time varying quantities according to the frequency hop sequence.

At the end of a frequency hopping interval, the add laser must be tuned rapidly to the next optical frequency in the predetermined frequency hop sequence. If the add laser is not capable of such rapid tuning then two (or more) lasers may be configured in parallel, and one of these lasers may be selected by a fast optical switch. The unused laser is tuned during the interval between frequency hop events, while the laser in use maintains its optical frequency.

The optical transmission system must support transmission of the broadband noise spectrum as though it contains information-bearing channels. If the optical signal-to-noise ratio of the link is not high enough, the optical noise can be filtered to a narrower optical spectrum, and the resulting reduction in the broadband noise optical bandwidth reduces the level of security to some extent. The detection method must be able to effectively select a WDM channel from its neighbors with no guard band, which is possible, for example, by using crosstalk subtraction in the DSP, as described in U.S. Patent Application No. 2004/0114939, or by orthogonal frequency division multiplexing.

1. Security Level of Optical Domain Encryption

The degree of security of the transmitted message using the method of the present invention may be estimated and compared to other optical domain encryption methods. First, the security level of frequency hopping alone is considered, in a configuration where one channel is transmitted. There is an improvement in security because the eavesdropper is forced to deploy $N_{ch}$ times as much receiving equipment as the intended recipient, where $N_{ch}$ is the number of possible frequency hop channels. It is easiest to design the system where the average time spent at each frequency is more than a digital symbol length (slow frequency hopping), but it may be less than a symbol length (fast frequency hopping).

Second, the case is considered where a number $N_{dum}$ dummy channels carrying fake information are transmitted in addition to the one information-bearing channel (or equivalently other different information-bearing channels are added if there is need for them). This second scheme is more secure than the first scheme with only one channel. If the time spent at each frequency is $\tau_h$ (which does not have to be constant), the symbol length is $\tau_s$ and the number of bits/symbol is $M_s$. The data on the information-bearing channel should have the property that $M_{av}$ consecutive bits must be received correctly to be able to reconstruct any of the message. This property may be imposed by applying a code to the data which has a long avalanche length. In order for a receiver to be able to recover any information $M_{av}/M_s$ consecutive symbols or $M_{cor}$ consecutive FH intervals must be received correctly, where $$M_{cor} = \frac{M_{av}\tau_s}{M_s\tau_h}$$

Thus, the eavesdropper must try many permutations of concatenated FH segments to find the correct one, where the number of permutations is $$\text{number of permutations} = (N_{dum}+1)^{M_{cor}} \quad (8)$$

For each permutation the eavesdropper must examine the apparently received message to decide whether it is a genuine message, which requires some processing. By arranging for $N_{dum}$ and $M_{cor}$ to be large, this number may be made so large that breaking the code this way is impracticable. However increasing $N_{dum}$ does involve the expense of deploying dummy transmitters that do not carry useful information. The secret communications scheme of the present invention is equivalent to using the broadband optical source to emulate a large number of dummy channels packed without guard bands between them. In fact the number of dummy channels becomes the maximum possible $$N_{dum} = N_{ch} - 1$$

The number of permutations of equation 8 becomes $$\text{number of permutations} = N_{ch}^{M_{cor}}$$

which may be an extraordinarily large number using modest design parameters for $N_{ch}$ and $M_{cor}$. The broadband optical noise source is cost effective compared to even a moderate number of dummy channels, since it requires no high speed modulation components.

There is another aspect of the optical domain encryption scheme that makes it secure. The amount of information that the eavesdropper has to store to attempt to crack the code is very large. The C-band of an erbium noise source has several terahertz of bandwidth which must be sampled at the Nyquist rate equal to twice that bandwidth. The resolution of the A/D converters has to be high even if the modulation format is a binary format. The rate at which the eavesdropper processes information is the product of the sampling rate and the A/D converter resolution. While there are integrated circuits (ICs) available which process data at high line rates, for example for forward error correction processing, these ICs make a modest number of calculations on the input and then pass it on to the devices that follow. The processing that the eavesdropper must apply to the received data is to first attempt symbol phase, polarization and optical phase recovery; then try a very large number of permutations of different frequency hop intervals; and then crack the codes on the underlying data. This task is too much to be done within one IC and would occupy years (or more probably billions of years) duration using currently available IC technologies. In consequence, the raw data must be written to a slower storage medium and reside there until processing is complete. Thus, the eavesdropper must possess a very large amount of storage (in addition to the computing resources) to be able to record the encrypted signal, and this amount of storage can be made to be unfeasibly high. This feature gives the optical domain encryption method an additional degree of security over existing encryption methods, in that an eavesdropper cannot realistically even make a recording of the message to decrypt later.

An approach which can be taken by an eavesdropper to attack the encryption method is to apply processing on all of the channel slots to quickly decide which channel slots are not carrying an information-bearing signal, and discard any such channels. To successfully eavesdrop, a test is needed which estimates the probability that a channel is carrying a true signal during a given interval. If the test is 100% accurate then the encryption method is defeated. If it is partially accurate then the eavesdropper can narrow the search to a subset of the channels, which could make the memory storage and processing time requirements feasible for the eavesdropper. The encryption system design must therefore ensure that no test can exist which is approximately accurate.

Figure 18:
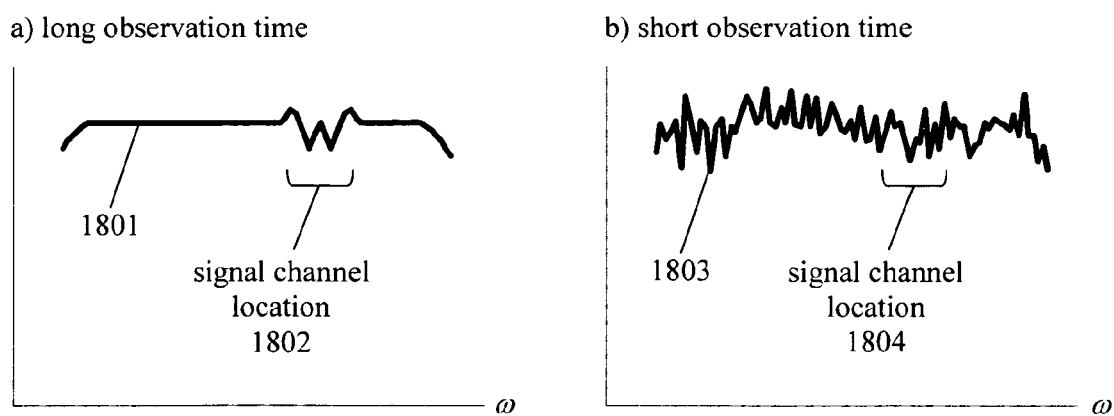
FIG. 18 illustrates the spectrum of a signal embedded in broadband noise where the shape of the signal does not match the notch carved in the noise, as seen for two different observation times.

Any test may be based on a difference between a statistical property of the signal's electric field compared to true optical noise. Keeping the frequency hop interval $\tau_h$ short helps ensure there cannot be a good test for the eavesdropper. Any function of the optical noise measured over a finite time interval shows a range of values, that is its sampling distribution. As the observation interval $\tau_h$ becomes shorter, then the sampling distribution of the function becomes wider, and overlaps the sampling distribution of the same function applied to a true signal. For example, FIG. 18 illustrates a situation where the spectral shape of the added signal does not match the shape carved out of the optical noise spectrum. FIG. 18a illustrates the received optical spectrum 1801 that might be observed, which is a smooth spectrum containing a ripple feature 1802 at the signal channel location. The ripple is caused by a spectral stitching error, which may be used as the basis of a test for the eavesdropper. However, a smooth spectrum shown in FIG. 18a is obtained after a long observation interval (assuming the signal stays at the same channel). After a short observation interval a spectrum such as the received spectrum 1803 of FIG. 18b is observed. The stitching error signature 1804 associated with the signal channel cannot be picked out of a spectrum like FIG. 18b. Hence inadequacies in the design of the coherent channel substitution system may be tolerated if the frequency hopping interval $\tau_h$ is sufficiently short.

2. Noise-Rendering

The information-bearing signal must be disguised to appear like optical noise. The inphase and quadrature parts of one SOP of an optical noise field are each Gaussian noises. Optical noise contains power in both polarization states, although the optical noise could be purposely polarized for this application. The distribution of the inphase part of the information-bearing signal depends on what modulation format is used, but it is typically not Gaussian. For example, if polarization multiplexed QAM is used with $M_s$ bits/symbol, the x-polarization of the QAM signal takes on complex values $u_n$ at the symbol centers (n=0,1,2, . . . ), defined by the information to be transmitted. The distribution $f(\text{Re}[u])$ of the real part of $u_n$ comprises $2^{M_s/4}$ delta spikes separated by d. For the example of 16 level QAM, $f(\text{Re}[u])$ comprises four delta spikes.

Two ways are discussed below to convert this distribution into a Gaussian distribution, that is to noise-render the signal. The data carried by the signal must appear random. It may be precoded if necessary, for example by performing an exclusive or operation with a pseudorandom sequence derived from the key.

The first noise-rendering method begins by adding to $u_n$ a pseudorandom complex variable $w_n$, whose real and imaginary parts each follow a uniform distribution $$f(\text{Re}[w]) = \frac{1}{d} \quad -\frac{d}{2} \le \text{Re}[w] \le \frac{d}{2}$$

$$f(\text{Re}[w]) = 0 \quad |\text{Re}[w]| > \frac{d}{2}$$

$$f(\text{Im}[w]) = \frac{1}{d} \quad -\frac{d}{2} \le \text{Im}[w] \le \frac{d}{2}$$

$$f(\text{Im}[w]) = 0 \quad |\text{Im}[w]| > \frac{d}{2}$$

The distribution of $w_n$ appears as a square on the complex plane. $w_n$ may be obtained from a pseudorandom data sequence which is generated from the key. The real and imaginary parts of $u_n + w_n$ each has a uniform distribution from $-2^{M_s/4-1}d$ to $2^{M_s/4-1}d$. Then the sum is transformed into a quantity having a Gaussian distribution by taking the inverse error function of each part. The result may be used for that inphase component of the electric field envelope $$E_{outx}(n\tau_s) = \sqrt{2}\,\sigma\,\text{inverf}\left(\frac{\text{Re}[u_n + w_n]}{2^{M_s/4-1}d}\right) + i\sqrt{2}\,\sigma\,\text{inverf}\left(\frac{\text{Im}[u_n + w_n]}{2^{M_s/4-1}d}\right)$$

where $\sigma$ is the standard deviation of a component of the optical noise to which the signal is to be matched. The inverse error function may be stored in a look-up table. Applying this transformation causes a penalty compared to using the modulation format unaltered, 3.4 dB in the case of QPSK.

The second noise-rendering method is to multiply $u_n + w_n$ by a phase factor $e^{i\theta_n}$ and a real function $q(|u_n + w_n|)$ to give $$q(|u_n + w_n|)e^{i\theta_n}(u_n + w_n) \quad (9)$$

$\theta_n$ is a pseudorandom number sequence derived from the secret key, and is uniformly distributed between 0 and $\pi/2$. The phase argument of $e^{i\theta_n}(u_n + w_n)$ is therefore uniformly distributed from $-\pi$ to $\pi$. The function $q(|u_n + w_n|)$ is the correct function to translate the distribution of $|u_n + w_n|$ onto a Rayleigh distribution. Since the quantity of equation 9 has a Rayleigh distributed amplitude and uniform phase, it is distributed like Gaussian noise. The advantage of the second noise-rendering method is that it preserves the phase of $u_n + w_n$, which has application in the optical phase recovery operation.

There are other ways of making the QAM signal appear like Gaussian noise, and there are noise-rendering methods for other classes of modulation format.

A component of the signal's electric field envelope cannot be made to be truly Gaussian by the methods above because the finite range of the D/A converters prohibits setting extreme values, while the Gaussian distribution extends to infinity. If the actual distribution deviates too much from Gaussian the eavesdropper can use this property in a test to decide if the channel being observed is likely to be the data-bearing channel, and so weakens the security of the overall encryption method. The output of the coherent channel substitution scheme may be made to resemble Gaussian noise more closely by passing it through a passive optical component which has multipath interference (MPI) longer than one symbol length. Such a component may be made in a planar waveguide system by splitting the signal into several paths of different lengths and recombining them, or by using multiple birefringent elements in sequence. The transfer function of this passive component must be reversed at the receiver, for example by the corresponding mathematical operation in the receiver's DSP. The transformation of the passive component should be made to change suddenly at intervals, according to a sequence derived from the key, otherwise if the eavesdropper correctly guesses the transformation at one point in time he can use that knowledge from then on, and the code is weakened.

3. Symbol Clock Recovery

The receiver must recover the symbol clock, the optical phase and, in the case where depolarized optical noise is used over a fiber optic link, the correct polarization transformation. These tasks are more challenging after the signal is disguised as Gaussian noise.

With a standard modulation format, the signal either contains a pilot tone of the symbol clock, or applying a nonlinearity generates some symbol clock content. This is no longer the case after noise-rendering. In fact, if it were possible to see clock content so easily it could be used by an eavesdropper as a test to identify which channel carries the true information-bearing signal.

The symbol clock may be sent from transmitter to receiver outside the signal channel. A dedicated uncoded wavelength channel may be used. Alternatively, the whole broadband optical noise spectrum may be modulated with a tone at the clock frequency, so that the information-bearing channel does not appear different from the other channels. These methods may also deliver the clock to an eavesdropper, so it is more secure to rely on the clock being recovered from the noise-rendered signal.

Variations in the phase of the symbol clock are slow since very high frequency stability radio frequency sources are available, and because the change in propagation delay of long fiber optic links is slow. Once symbol clock has been acquired, its slow changes may be tracked. Initial acquisition may be completed by sweeping the clock phase coarsely over the full range and using a metric of signal quality such as bit error rate, or whether the digital signal is recovered at all, to determine which clock phase value is closest to optimum. The clock phase may then be optimized using the BER as a metric.

The propagation delay of a fiber link, and hence the clock phase, changes when the laser is hopped in frequency. The amount of delay change may be predicted exactly by knowing the chromatic dispersion of the link. This quantity may be measured at the start of communications by determining the symbol phase at several different optical frequencies.

4. Polarization Recovery

The polarization transformation between transmitter and receiver is described by three degrees of freedom, corresponding to the polar and azimuthal angles on the Poincare sphere representation of the principle states of polarization and the rotation angle. It changes in a random fashion slowly due to movement of an optical fiber or temperature changes, perhaps varying between a few 10s of uncorrelated SOPs in 1 second. Once the correct polarization transformation has been found any changes may be tracked. The polarization transformation at any point in time will vary over the frequency hopping band, because of the polarization mode dispersion (PMD) of the optical fiber. Furthermore, the change in polarization transformation going from one optical frequency to another will itself change randomly with time. An SOP reference may be provided by a polarized channel at a different wavelength from the signal. However, the optical frequency of the reference channel should be swept across the band in order to take into account the variation of the polarization transformation with optical frequency. Of course the frequency hopping sequence must be chosen to avoid a collision with the reference channel. Alternatively, the broadband optical noise may be polarized at the transmitter, as explained above, so that polarization recovery becomes trivial. Again, providing a polarization reference helps an eavesdropper as well as the intended recipient, and it is more secure to derive the polarization transformation from the noise-rendered signal.

The polarization transformation may be acquired by first sweeping the three SOP degrees of freedom coarsely over the full range, using a signal quality metric such as BER or the quality of the recovered optical phase, discussed below, to find the best point. A fine adjustment may then be made to find the optimum polarization transformation. This process must be completed at several optical frequencies in the FH plan, so as to gain knowledge of how PMD changes the polarization transformation over optical frequency. The FH plan must revisit all regions of the available optical spectrum sufficiently frequently to derive an update to the polarization transformation at all optical frequencies.

5. Optical Phase Recovery

The optical phase is the hardest of the three quantities to obtain. Unless an expensive narrow linewidth laser is used, the phase noise of the laser varies on a shorter timescale than the symbol clock phase or the polarization transformation. In addition, the latter two quantities do not have to be reacquired after hopping to a new frequency, given that the chromatic dispersion and the effect of polarization mode dispersion are known. Typically, when a laser tunes in an optical frequency, the phase after tuning is unknown, and a frequency error may also occur. The optical phase must be reacquired at the start of each frequency hopping interval.

The frequency offset between the signal centre frequency and the receiver local oscillator is generally within a small range, specified by the design of the transmitter and receiver. The optical phase and frequency may be acquired by a search of the frequency and phase space looking for the presence of a recognizable signal and a low BER. This approach may be slow or require a high level of parallelism in the DSP. If the time taken to acquire is longer than the available buffer in the DSP then some data will be lost at each FH interval.

When the second noise-rendering transformation described above is used it is possible to acquire the carrier phase and frequency by a more standard faster method. The electric field of one SOP of the noise-rendered signal, as seen at the receiver, after inverting the effect of the MPI passive, is $$q(|u_n+w_n|)e^{i\theta_n+i(\omega_s-\omega_{LO})t+i(\phi_s(t)-\phi_{LO}(t))}(u_n+w_n)$$

$(\omega_s-\omega_{LO})t+\phi_s(t)-\phi_{LO}(t)$ is the phase difference between the signal and the LO and is not yet known. Dividing by the inverse of $q(|u_n+w_n|)$, which does not change the phase angle, and multiplying by $e^{-i\theta_n}$, which is known to the receiver, gives $$e^{i(\omega_s-\omega_{LO})t+i(\phi_s(t)-\phi_{LO}(t))}u_n+e^{i(\omega_s-\omega_{LO})t+i(\phi_s(t)-\phi_{LO}(t))}w_n \qquad (10)$$

Even though the $w_n$ are known, $e^{i(\omega_s-\omega_{LO})t+i(\phi_s(t)-\phi_{LO}(t))}w_n$ appears random, and its presence in the expression makes direct phase recovery difficult. Phase recovery is possible by selecting only those symbols where $|w_n|$ is small, so that the received value of equation 10 is close to $e^{i(\omega_s-\omega_{LO})t+i(\phi_s(t)-\phi_{LO}(t))}u_n$, and the standard phase estimation method for that modulation format may be used. The phase estimation algorithm may be modified to weight the points inversely according to $|w_n|$. For some QAM cases, for example QPSK, the step of dividing by the inverse of $q(|u_n+w_n|)$ does not affect the phase recovery operation, and that step may be omitted to make the operation simpler. Because it effectively uses only a few of the incoming symbols, this version of phase estimation algorithm requires narrower linewidth signal and LO lasers and have a longer acquisition time than applying the standard algorithm to a signal that has not been noise-rendered. If there is a buffer store in the DSP that is longer than the acquisition time, then the recovered phase may be applied to the early symbols in the frequency hop interval, and there will be no data loss. An eavesdropper who does not know $w_n$ and $\theta_n$ cannot use this method to recover the optical frequency and phase.

An additional benefit of using the second noise-rendering method and part of the optical phase acquisition algorithm is that it may be used with the symbol phase and polarization transformation acquisition routines as a signal quality metric. When the symbol phase and polarization transformation are close to correct, the quantity $$|e^{i(\omega_s-\omega_{LO})t+i(\phi_s(t)-\phi_{LO}(t))}u_n+e^{i(\omega_s-\omega_{LO})t+i(\phi_s(t)-\phi_{LO}(t))}w_n| \qquad (10)$$

is close to any of a small number of values at times when $|w_n|$ is low. The number of allowed values is the number of possible values of $|u_n|$, which depends on the modulation format; for QPSK there is only one allowed value. The spread of values of this quantity at times when $|w_n|$ is low may be used as a signal quality metric.

The main issues with optical phase recovery are avoided if the signal laser in the transmitter (the add laser) and the local oscillator in the receiver are referenced to lines in a frequency-stabilized octave-spanning optical comb. The transmit site and receive site may each hold a comb generator, and these will contain identical optical frequencies to one another given that they use the same radio frequency reference. The signal laser output should be phase locked to the comb. It does not have to be the same optical frequency as one of the lines in the comb, but it has to differ from a line by a fixed frequency and no phase noise. The receiver local oscillator does not have to be phase locked to the octave-spanning comb, but its frequency and phase should be compared to one of the lines in the comb and known by the DSP. The receiver DSP then knows the exact frequency and phase of the LO compared to the signal, apart from a slowly varying contribution to the phase from the varying length of the fiber optic link with temperature. The chromatic dispersion needs to be known accurately, as it causes a jump in optical phase after a frequency hop. Given that it is phase locked to an absolute reference, the frequency hopping executed by the transmitter may then be considered to be coherent frequency hopping.

F. Appendix

1. Use of Complex Numbers to Describe Modulated Signals

Complex numbers are used to describe sine and cosine functions because this notation is a compact way of including the phase of the sine wave or cosine wave. For example the electric field is written in the form $$E(t) = Re[E_s e^{i\omega t}] \tag{A1}$$

where $E_s$ is a complex number. This may be expressed in terms of sines and cosines as $$E(t) = Re[E_s]\cos(\omega t) - Im[E_s]\sin(\omega t)$$

Or if complex $E_s$ is written in terms of its magnitude and phase $$E_s = |E_s| e^{i\theta_s}$$

then A1 becomes $$E(t) = |E_s|\cos(\omega t + \theta_s)$$

The complex number notation is compact because the phase of the sine wave is stored in the phase of the complex number.

In the above discussion are equations similar to $$\text{beat term} = Re[E_s E_{LO}^* e^{i\omega t}] \tag{A2}$$

$E_{LO}^*$ is the complex conjugate of $E_{LO}$, meaning that every occurrence of i is replaced with −i, and $$E_{LO}^* = |E_{LO}| e^{-i\theta_{LO}}$$

A2 may be rewritten as $$\text{beat term} = |E_s||E_{LO}|\cos(\omega t + \theta_s - \theta_{LO})$$

The appearance of $E_s E_{LO}^*$ in A2 means to take the phase difference between $E_s$ and $E_{LO}$.

The power of an optical wave is given by the magnitude squared of the complex electric field, and does not have a sinusoid time dependence. So in the case of a field given by A1

$$\text{power} = (E_s e^{i\omega t})^* (E_s e^{i\omega t}) = |E_s|^2$$

2. Jones Vectors

The state of polarization of an optical signal may be described by a Jones vector. This is a two element column vector. Each element is the complex envelope of the electric field, i.e., phase information included. The top element is the component of the field in the x-direction (horizontal) and the bottom element in the y-direction (vertical). In fact x and y may be an arbitrary pair of orthogonal directions. "Optics" by E. Hecht (Addison-Wesley, 4th ed., 2001) gives a thorough account of Jones vectors.

Some Jones vectors of familiar states of polarization are listed below.

$$\begin{pmatrix} 1 \\ 0 \end{pmatrix} \quad \text{horizontal}$$

$$\begin{pmatrix} 0 \\ 1 \end{pmatrix} \quad \text{vertical}$$

$$\frac{1}{\sqrt{2}}\begin{pmatrix} 1 \\ 1 \end{pmatrix} \quad \text{linearly polarized at } 45°$$

$$\frac{1}{\sqrt{2}}\begin{pmatrix} 1 \\ i \end{pmatrix} \quad \text{circular}$$

A Jones unit vector $\hat{p}$ has the property that $$\hat{p} \cdot \hat{p}^* = 1$$

If light polarized in SOP $\hat{p}_1$ passes through a polarizer oriented in direction $\hat{p}_2$, then the magnitude of the electric field is scaled by $\hat{p}_1 \cdot \hat{p}_2^*$, and the direction of the electric field is changed to $\hat{p}_2$. In general $0 \leq |\hat{p}_1 \cdot \hat{p}_2^*| \leq 1$.

When polarized light is passed through a linear optical element, the transformation of the SOP is described by premultiplying by a 2×2 matrix called the Jones matrix of the optical element.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An optical communications system receiving an input optical signal and producing an output optical signal, said optical communications system comprising:
   a combining means for receiving the input optical signal and an add optical signal, said combining means combining the input optical signal and add optical signal such that the input optical signal and the add optical signal coherently interfere to form the output optical signal;
   wherein the light source of the add optical signal is not the light source for the input optical signal, and the optical spectrum of the add optical signal has substantial magnitude at frequencies where the optical spectrum of the input optical signal has substantial magnitude; and
   the combining means sending the output optical signal;
   whereby said output optical signal contains information.

2. The optical communications system of claim 1 further comprising:
   a laser emitting light;
   a modulation subsystem;
   a digital to analog (D/A) converter; and
   a digital signal processor; and
   wherein:
   the light from said laser is modulated by said modulation subsystem to produce the add optical signal;
   said modulation subsystem is adjusted by at least one analog voltage, the analog voltage being produced by said D/A converter;
   said D/A converter is controlled by said digital signal processor; and
   the optical phase difference between the input optical signal and light from said laser is known by said digital signal processor, and the state of polarization of said input optical signal compared to light from said laser is known by said digital signal processor.

3. The optical communications system of claim 2 further comprising:
an input monitor; and
an input monitor splitter; and
wherein:
said input monitor splitter separates a portion of power from the input optical signal to make a replica of the input optical signal, and the remaining power of the input optical signal is directed to said combining means;
said input monitor receives the replica of the input optical signal; and
said input monitor includes sampled coherent detection means and delivers data to said digital signal processor;
whereby said digital signal processor knows the electric field envelope of said input optical signal.

4. The optical communications system of claim 3 wherein said sampled coherent detection employs local oscillator light and said local oscillator light is a replica of light from said laser.

5. The optical communication system of claim 3 further including a delay element;
wherein:
said delay element is located between said input monitor splitter and said combining means; and
the time delay of said delay element is chosen such that the optical phase of the add optical signal compared to the input optical signal at the point where the add optical signal coherently interferes with the input optical signal is substantially the same as the value of optical phase of said add optical signal compared to said input optical signal known by said digital signal processor.

6. The optical communication system of claim 2 further comprising an output monitor; and
wherein:
said output monitor receives an output monitor optical signal that is the output optical signal or a replica of the output optical signal; and
said output monitor includes a photodetector and an analog to digital (A/D) converter, said photodetector being electrically connected to said A/D converter and said A/D converter communicating with said digital signal processor; and
whereby said digital signal processor knows a basic parameter of the input optical signal compared to the add optical signal.

7. The optical communications system of claim 6 wherein:
said output monitor includes a sampled coherent detection means; and
said sampled coherent detection means includes said photodetector and said A/D converter.

8. The optical communications system of claim 2 wherein:
said modulation subsystem comprises two pairs of amplitude modulators, each of said pairs being in a Mach-Zehnder configuration such that the inphase and quadrature components of light are independently modulated; and
said Mach-Zehnder configurations are connected in a polarization diverse configuration such that the two states of polarization are independently modulated.

9. The optical communications system of claim 2 wherein:
the input optical signal and the output optical signal contain information in a single state of polarization; and
said modulation subsystem includes a polarization adjuster that responds relatively slower than either of the information signaling rates of the input optical signal and the output optical signal.

10. The optical communications system of claim 2 wherein:
the input optical signal and the output optical signal have information encoded in modulation formats that are on-off modulation or binary phase shift keyed modulation; and
said modulation subsystem included an optical phase adjuster that responds relatively slower than the either of the information signaling rates of the input optical signal and the output optical signal.

11. The optical communications system of claim 2 wherein:
the input optical signal contains a first wavelength division multiplexed channel containing a first set of information; and
the output optical signal contains a second wavelength division multiplexed channel having the same wavelength as the first wavelength division multiplexed channel, said second wavelength division multiplexing channel containing a second set of information; and
said second set of information is substantially different from said first set of information.

12. The optical communications system of claim 11 further comprising an input monitor and an input monitor splitter; and
wherein:
said input monitor splitter separates a portion of power from the input optical signal to make a replica of the input optical signal and the remaining power of the input optical signal is directed to said combining means; and
said input monitor receives the replica of the input optical signal; and
said input monitor includes sampled coherent detection means and delivers data to said digital signal processor;
whereby said digital signal processor knows the electric field envelope of the input optical signal.

13. The optical communications system of claim 2 wherein:
the input optical signal contains a first wavelength division multiplexed channel; and
the output optical signal does not contain a wavelength division multiplexed channel at the same wavelength as the first wavelength division multiplexed channel.

14. The optical communications system of claim 2 wherein:
the input optical signal contains a first wavelength division multiplexed channel containing a first set of information and also containing noise; and
said output optical signal contains a second wavelength division multiplexed channel having the same wavelength as the first wavelength division multiplexed channel, the second wavelength division multiplexing channel containing a second set of information with substantially less noise than the first wavelength division multiplexing channel; and
the second set of information is substantially the same as the first set of information.

15. The optical communications system of claim 14 further comprising an input monitor and an input monitor splitter; and wherein:
said input monitor splitter separates a portion of power from the input optical signal to make a replica of the input optical signal, and the remaining power of the input optical signal is directed to said combining means;
said input monitor receives the replica of the input optical signal; and
said input monitor includes sampled coherent detection means and delivers data to said digital signal processor;
whereby said digital signal processor knows the electric field envelope of the input optical signal.

16. The optical communications system of claim 2 wherein:
the input optical signal contains a first wavelength division multiplexed channel containing a plurality of tributaries including a first tributary and a second tributary, the first tributary containing a first set of information, and the second tributary containing a second set of information; and
the output optical signal contains a second wavelength division multiplexed channel having the same wavelength as the first wavelength division multiplexed channel, the second wavelength division multiplexing channel containing a plurality of tributaries including a third tributary and a fourth tributary, the third tributary containing a third set of information and the fourth tributary containing a fourth set of information; and the first set of information is substantially the same as the third set of information, and the second set of information is substantially different from the fourth set of information.

17. The optical communication system of claim 2 wherein:
the input optical signal originates from a broadband optical noise source; and
the output optical signal contains an information-bearing channel in the spectral region neighboring the wavelength of said laser; and
the output optical signal contains spectral content from said broadband optical noise source in a different spectral region.

18. The optical communication system of claim 17 wherein the wavelength of said laser is varied over time.

19. The optical communication system of claim 17 wherein the information is imposed on the light from said laser so that the information-bearing channel resembles a spectral slice of broadband optical noise.

20. A method of producing an output optical signal from an input optical signal, said method comprising the step of:
coherently interfering said input optical signal with an add optical signal, the light source for the add optical signal being a different light source to the light source for the input optical signal, and the optical spectrum of the add optical signal having a substantially similar shape to the optical spectrum of the input optical signal;
whereby the output optical signal contains information.

21. The method of producing an output optical signal of claim 20, further comprising the steps of:
modulating light from a laser by a modulation subsystem to produce the add optical signal; and
controlling said modulation subsystem by a digital signal processor, said digital signal processor knowing the optical phase difference between the input optical signal and light from said laser and the state of polarization of the input optical signal compared to light from said laser.

22. The method of producing an output optical signal of claim 21, further comprising the steps of:
monitoring the input optical signal with a sampled coherent detection means, said sampled coherent detection means delivering data to said digital signal processor, said digital signal processor knowing the electric field envelope of the input optical signal; and
directing light from said laser to said sampled coherent detection means to be used as local oscillator light.

23. The method of producing an output optical signal of claim 21, further comprising the step of monitoring the output optical signal with an output monitor, said output monitor delivering data to said digital signal processor;
said digital signal processor knowing a basic parameter of said input optical signal compared to the add optical signal.

24. The method of producing an output optical signal of claim 21 when the input optical signal and the output optical signal contain information in a single state of polarization, further comprising the step of:
adjusting the state of polarization of light by said modulation subsystem from said laser substantially more slowly than either of the information signaling rates of the input optical signal and the output optical signal.

25. The method of producing an output optical signal of claim 21 when the input optical signal and the output optical signal have information encoded in modulation formats are on-off modulation or binary phase shift keyed modulation, further comprising the step of:
adjusting, by said modulation subsystem, the optical phase of light from said laser substantially more slowly than either of the information signaling rates of the input optical signal and the output optical signal.

26. The method of producing an output optical signal of claim 21 when the input optical signal contains a plurality of wavelength division multiplexed channels containing information, further comprising the step of:
interfering the add optical signal with one of said wavelength division multiplexed channels to change the information carried on said wavelength division multiplexed channel.

27. The method of producing an output optical signal of claim 21 when the input optical signal contains a wavelength division multiplexed channel containing information and noise, further comprising the step of:
interfering the add optical signal with said wavelength division multiplexed channel to change said wavelength division multiplexed channel to a wavelength division multiplexed channel containing the substantially the same information and less noise.

28. The method of producing an output optical signal of claim 21, further comprising the steps:
producing the input optical signal from a broadband optical noise source; interfering the add optical signal with a spectral slice of light from said broadband optical noise source to replace said spectral slice with an information-bearing channel.

29. The method of producing an output optical signal of claim 28 wherein said laser changes its wavelength over time.

30. The method of producing an output optical signal of claim 28 wherein said information-bearing channel resembles a spectral slice of broadband optical noise.

* * * * *